(12) United States Patent
Yamauchi

(10) Patent No.: US 8,008,868 B2
(45) Date of Patent: Aug. 30, 2011

(54) DISCHARGE LAMP STARTER, METHOD FOR CONTROLLING THE SAME, AND PROJECTOR

(75) Inventor: Kentaro Yamauchi, Ashiya (JP)

(73) Assignee: Seiko Epson Corporation, Tokyo (JP)

( * ) Notice: Subject to any disclaimer, the term of this patent is extended or adjusted under 35 U.S.C. 154(b) by 366 days.

(21) Appl. No.: 12/404,340

(22) Filed: Mar. 16, 2009

(65) Prior Publication Data

US 2009/0237623 A1 Sep. 24, 2009

(30) Foreign Application Priority Data

Mar. 21, 2008 (JP) ................................. 2008-074217

(51) Int. Cl.
*G05F 1/00* (2006.01)
*H05B 37/02* (2006.01)
*H05B 39/04* (2006.01)
*H05B 41/36* (2006.01)

(52) U.S. Cl. ..................... 315/291; 315/209 R; 315/307; 315/308

(58) Field of Classification Search ........................ None
See application file for complete search history.

(56) References Cited

U.S. PATENT DOCUMENTS

| 6,815,907 | B2 | 11/2004 | Riederer | |
| 2002/0041165 | A1* | 4/2002 | Cammack | ..................... 315/291 |
| 2003/0080693 | A1 | 5/2003 | Ono et al. | |
| 2006/0158133 | A1 | 7/2006 | Vermeulen et al. | |
| 2009/0121640 | A1* | 5/2009 | Ootsuka et al. | ............... 315/129 |
| 2010/0084988 | A1* | 4/2010 | Nagata et al. | ................. 315/246 |

FOREIGN PATENT DOCUMENTS

| EP | 1309228 A2 | 5/2003 |
| JP | 2005-038815 A | 2/2005 |
| JP | 2005-050662 A | 2/2005 |
| JP | 2005-100786 A | 4/2005 |
| WO | WO-2005-006819 A1 | 1/2005 |

OTHER PUBLICATIONS

European Search Report, Jul. 31, 2009, issued in related Patent Application No. EP-09155096.

* cited by examiner

*Primary Examiner* — Anh Tran
(74) *Attorney, Agent, or Firm* — AdvantEdge Law Group, LLC

(57) ABSTRACT

In at least one embodiment of the disclosure a discharge lamp lighting apparatus includes a controller configured to control an AC conversion circuit to perform AC conversion control for controlling the timings at which a polarity of the discharge lamp driving AC current is reversed. The controller is configured to control the power control circuit to perform current control for controlling a magnitude of the DC current. The controller changes the accumulated energy supplied to each electrode of a discharge lamp in one cycle of the discharge lamp driving AC current in accordance with a periodic pattern. The periodic pattern includes a plurality of segmented periods during each of which the accumulated energy is maintained at a same level for a plurality of cycles of the discharge lamp driving AC current, and a level of the accumulated energy in at least two of the segmented periods differ from each other.

15 Claims, 12 Drawing Sheets (A) FIRST POLARITY STATE P1

(B) SECOND POLARITY STATE P2

(C)

(D)

DISCHARGE LAMP STARTER, METHOD FOR CONTROLLING THE SAME, AND PROJECTOR

CROSS-REFERENCE

The present application claims priority from Japanese Patent Application No. 2008-074217 filed on Mar. 21, 2008, which is hereby incorporated by reference in its entirety.

BACKGROUND

A high-pressure mercury lamp, a metal halide lamp, and other discharge lamps may be used as the light source of a projector. In such discharge lamps, discharging causes electrode consumption, which changes the shapes of the electrodes. A plurality of protrusions that may grow at the tips of the electrodes or irregular consumption that may proceed in the electrode bodies causes an arc start point shift and an arc length change. These phenomena may lead to a reduction in luminance and life of the discharge lamp.

To solve the above problems, U.S. Pat. No. 6,815,907 proposes a method in which a discharge lamp driving AC current undergoes pulse width modulation with the absolute value thereof maintained at a substantially fixed level.

However, when the pulse width modulation of the discharge lamp driving AC current is carried out at a high frequency, such as in U.S. Pat. No. 6,815,907, steady convection is disadvantageously formed in association with light emission in the discharge lamp, resulting in uneven consumption of the electrodes and uneven precipitation of the electrode material in some cases.

Further, when a discharge lamp is used in a projector or any other similar apparatus, a user's dimming operation and mode switching operation (for example, switching between a high-luminance mode driven at a high power level and a long-life mode driven at a low power level) may change the driving power. To prevent the formation of steady convection associated with light emission in the discharge lamp, it is necessary to change the electrode temperature within the largest possible range. However, since the electrode temperature is proportional to the power supplied to the discharge lamp, particular care should be taken to significantly change the electrode temperature when the discharge lamp is driven at a low power.

SUMMARY

Various embodiments of the disclosure provide a discharge lamp lighting apparatus that suppresses the formation of steady convection in the discharge lamp driven at a low power to prevent uneven electrode consumption and uneven precipitation of the electrode material. Certain embodiments provide a method for controlling the discharge lamp lighting apparatus, and a projector.

A discharge lamp lighting apparatus according to at least one embodiment of the disclosure includes a power control circuit that outputs a DC current, an AC conversion circuit to which the DC current is inputted, the AC conversion circuit reversing the polarity of the DC current at predetermined timings to produce and output a discharge lamp driving AC current, and a controller that controls the AC conversion circuit to perform AC conversion control in which the timings at which the polarity of the discharge lamp driving AC current is reversed are controlled and controls the power control circuit to perform current control in which the magnitude of the DC current is controlled. The controller changes accumulated energy supplied to each electrode of the discharge lamp in one cycle of the discharge lamp driving AC current in accordance with a periodic pattern. The periodic pattern includes a plurality of segmented periods during each of which the accumulated energy is maintained at the same level for a plurality of cycles of the discharge lamp driving AC current, and the accumulated energy levels in at least two of the segmented periods differ from each other. The controller performs current control in which the controller externally receives a power control signal and sets the average of the DC current in the section that corresponds to one cycle of the discharge lamp driving AC current to the current magnitude that corresponds to the power control signal, and controls the magnitude of the accumulated energy in relation to the average value.

As such, the accumulated energy supplied to each electrode of the discharge lamp in one cycle of the discharge lamp driving AC current is changed in accordance with the periodic pattern including a plurality of segmented periods during each of which the accumulated energy supplied to each electrode of the discharge lamp in one cycle of the discharge lamp driving AC current is maintained at the same level for a plurality of cycles of the discharge lamp driving AC current, resulting in a temperature difference of several tens to several hundreds of degrees between the electrodes. It is therefore possible to suppress the formation of steady convection in the discharge lamp so as to prevent uneven consumption of the electrodes and uneven precipitation of the electrode material.

Further, controlling the magnitude of the accumulated energy in relation to the power for driving the discharge lamp allows suppression of the formation of steady convection in the discharge lamp and prevention of uneven consumption of the electrodes and uneven precipitation of the electrode material even when the discharge lamp is driven at a low power level.

The accumulated energy is the energy that corresponds to the amount of power supplied from the discharge lamp lighting apparatus in the period during which either of the electrodes acts as the anode.

A discharge lamp lighting apparatus according to another embodiment of the disclosure includes a power control circuit that outputs a DC current, an AC conversion circuit to which the DC current is inputted, the AC conversion circuit repeatedly reversing the polarity of the DC current between a first polarity and a second polarity at predetermined timings to produce and output a discharge lamp driving AC current, and a controller that controls the AC conversion circuit to perform AC conversion control in which the timings at which the polarity of the discharge lamp driving AC current is reversed are used to control a duty ratio that is the proportion of the period of the first polarity to one cycle of the AC current and controls the power control circuit to perform current control in which the magnitude of the DC current is controlled. The controller performs the AC conversion control in such a way that the duty ratio of the discharge lamp driving AC current is changed in accordance with a periodic pattern. The periodic pattern includes a plurality of segmented periods during each of which the duty ratio is maintained at the same value for a plurality of cycles of the discharge lamp driving AC current, and the duty ratios in at least two of the segmented periods differ from each other. The controller performs current control in which the controller externally receives a power control signal and sets the average of the DC current in the section that corresponds to one cycle of the discharge lamp driving AC current to the current magnitude that corresponds to the power control signal, and performs the AC conversion control in such a way that the difference between at least one of the maximum and minimum values of the duty ratio and a reference duty ratio is controlled in relation to the average value.

As such, the duty ratio of the discharge lamp driving AC current is changed in accordance with the periodic pattern including a plurality of segmented periods during each of which the duty ratio of the discharge lamp driving AC current is maintained at the same value for a plurality of cycles of the discharge lamp driving AC current, resulting in a temperature difference of several tens to several hundreds of degrees between the electrodes. It is therefore possible to suppress the formation of steady convection in the discharge lamp so as to prevent uneven consumption of the electrodes and uneven precipitation of the electrode material.

Further, controlling the magnitude of the accumulated energy in relation to the power for driving the discharge lamp allows suppression of the formation of steady convection in the discharge lamp and prevention of uneven consumption of the electrodes and uneven precipitation of the electrode material even when the discharge lamp is driven at a low power level.

The duty ratio is the proportion of the period of the first polarity to one cycle of the discharge lamp driving AC current whose polarity is switched between the first polarity and the second polarity.

The reference duty ratio may be, for example, 50%.

In the discharge lamp lighting apparatus, the controller may perform the AC conversion control in such a way that the difference between at least one of the maximum and minimum values of the duty ratio and the reference duty ratio is increased as the average value decreases.

A discharge lamp lighting apparatus according to another embodiment of the disclosure includes a power control circuit that outputs a DC current, an AC conversion circuit to which the DC current is inputted, the AC conversion circuit repeatedly reversing the polarity of the DC current between a first polarity and a second polarity at predetermined timings to produce and output a discharge lamp driving AC current, and a controller that controls the AC conversion circuit to perform AC conversion control in which the timings at which the polarity of the discharge lamp driving AC current is reversed are controlled and controls the power control circuit to perform section current control in which the magnitude of the DC current is controlled. The controller performs the section current control in such a way that the difference in the absolute value of the current magnitude between the first polarity section and the second polarity section of the discharge lamp driving AC current is changed in accordance with a periodic pattern. The periodic pattern includes a plurality of segmented periods during each of which the difference in the absolute value is maintained at the same value for a plurality of cycles of the discharge lamp driving AC current, and the differences in the absolute value in at least two of the segmented periods differ from each other. The controller performs the section current control in such a way that the controller externally receives a power control signal and sets the average of the DC current in the section that corresponds to one cycle of the discharge lamp driving AC current to the current magnitude that corresponds to the power control signal, and controls the difference in the absolute value in relation to the average value.

As such, the difference in the absolute value of the current magnitude between the first polarity section and the second polarity section of the discharge lamp driving AC current is changed in accordance with the periodic pattern including a plurality of segmented periods during each of which the difference in the absolute value of the current magnitude between the first polarity section and the second polarity section of the discharge lamp driving AC current is maintained at the same value for a plurality of cycles of the discharge lamp driving AC current. It is therefore possible to suppress the formation of steady convection in the discharge lamp so as to prevent uneven consumption of the electrodes and uneven precipitation of the electrode material.

Further, controlling the difference in the absolute value of the current magnitude between the first polarity section and the second polarity section of the discharge lamp driving AC current in relation to the power for driving the discharge lamp allows suppression of the formation of steady convection in the discharge lamp and prevention of uneven consumption of the electrodes and uneven precipitation of the electrode material even when the discharge lamp is driven at a low power level.

In the discharge lamp lighting apparatus, the controller may perform the section current control in such a way that at least one of the absolute values of the maximum and minimum values of the difference in the absolute value of the current magnitude is increased as the average value decreases.

In the discharge lamp lighting apparatus, the controller may perform the AC conversion control in such a way that the frequency of the discharge lamp driving AC current is controlled in relation to the average value.

In the discharge lamp lighting apparatus, the controller may perform the AC conversion control in such a way that the frequency of the discharge lamp driving AC current is increased as the average value decreases.

According to another embodiment of the disclosure, a discharge lamp lighting apparatus includes a power control circuit that outputs a DC current, and an AC conversion circuit to which the DC current is inputted, the AC conversion circuit reversing the polarity of the DC current at predetermined timings to produce and output a discharge lamp driving AC current. A method for controlling the discharge lamp lighting apparatus includes controlling the AC conversion circuit to perform AC conversion control in which the timings at which the polarity of the discharge lamp driving AC current is reversed are controlled, controlling the power control circuit to perform current control in which the magnitude of the DC current is controlled, and changing accumulated energy supplied to each electrode of the discharge lamp in one cycle of the discharge lamp driving AC current in accordance with a periodic pattern. The periodic pattern includes a plurality of segmented periods during each of which the accumulated energy is maintained at the same level for a plurality of cycles of the discharge lamp driving AC current, and the accumulated energy levels in at least two of the segmented periods differ from each other. The changing in accordance with the periodic pattern involves performing current control in which a power control signal is externally received and the average of the DC current in the section that corresponds to one cycle of the discharge lamp driving AC current is set to the current magnitude that corresponds to the power control signal, and the magnitude of the accumulated energy is controlled in relation to the average value.

A projector according to another embodiment of the disclosure includes any of the discharge lamp lighting apparatus described above.

BRIEF DESCRIPTION OF THE DRAWINGS

Non-limiting and non-exhaustive embodiments of the present disclosure will be described with reference to the accompanying drawings, wherein like numbers reference like elements.

DESCRIPTION OF EMBODIMENTS

In the following description, reference is made to the accompanying drawings which form a part hereof, and in which are shown, by way of illustration, specific embodiments in which the disclosure may be practiced. It is to be understood that other embodiments may be utilized and changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may.

Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

Optical System of Projector

Figure 1:
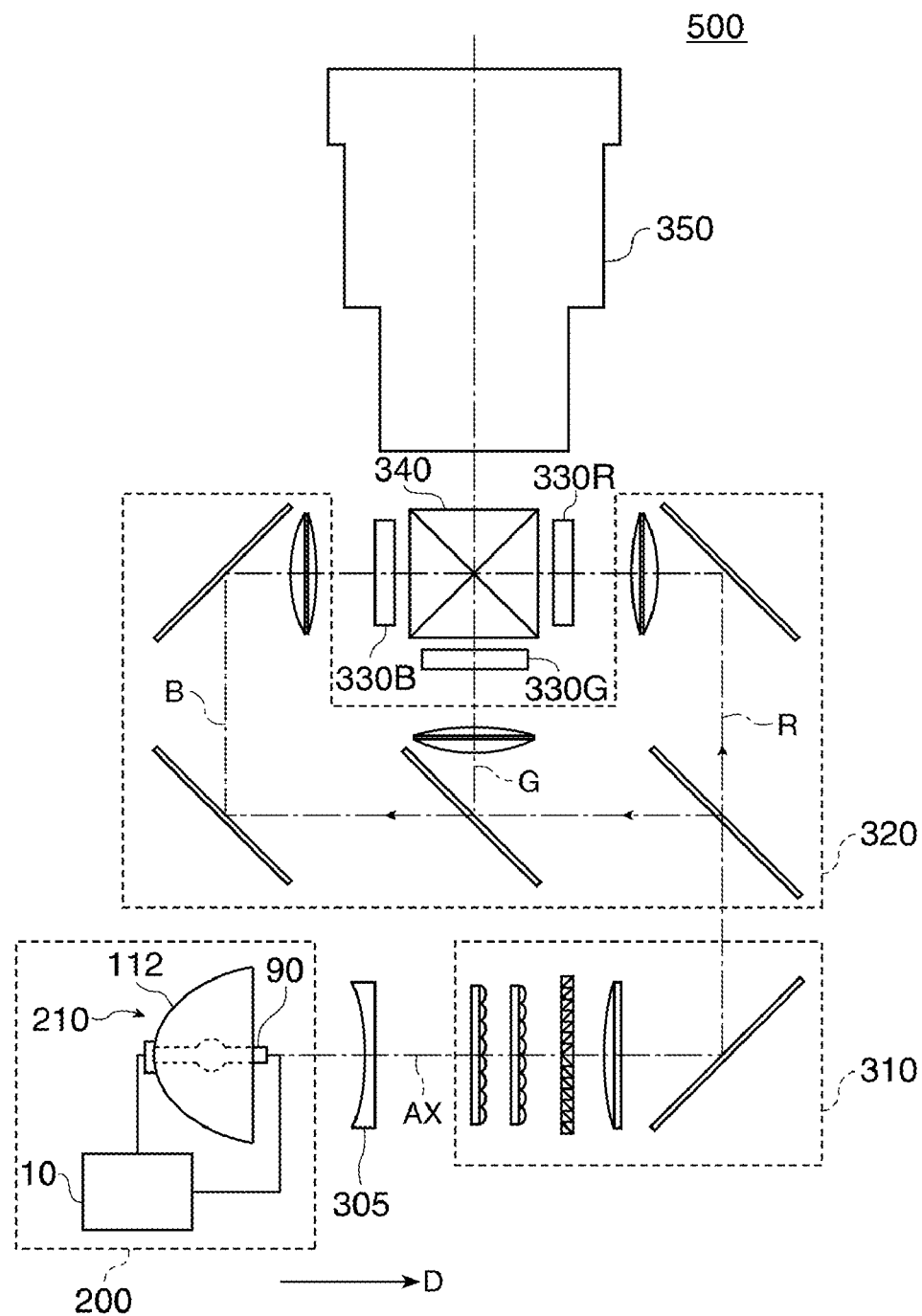
FIG. 1 illustrates an optical system of a projector according to at least one embodiment.

FIG. 1 is a descriptive diagram illustrating a projector 500 as an embodiment of the disclosure. The projector 500 includes a light source 200, a parallelizing lens 305, an illumination system 310, a color separation system 320, three liquid crystal light valves 330R, 330G, and 330 B, a cross dichroic prism 340, and a projection system 350.

The light source 200 includes a light source unit 210 and a discharge lamp lighting apparatus 10. The light source unit 210 includes a primary reflection mirror 112 and a discharge lamp 90. The discharge lamp lighting apparatus 10 supplies power to the discharge lamp 90 to turn on the discharge lamp 90. The primary reflection mirror 112 reflects the light emitted from the discharge lamp 90 in the illumination direction D. The illumination direction D is parallel to an optical axis AX. The light from the light source unit 210 passes through the parallelizing lens 305 and enters the illumination system 310. The parallelizing lens 305 parallelizes the light from the light source unit 210.

The illumination system 310 makes the illuminance of the light from the light source 200 uniform in the liquid crystal light valves 330R, 330G, and 330 B. The illumination system 310 aligns the polarization directions of the light beams from the light source 200 in order to effectively use the light from the light source 200 in the liquid crystal light valves 330R, 330G, and 330 B. The light adjusted in terms of the illuminance distribution and the polarization direction enters the color separation system 320. The color separation system 320 separates the incident light into three, red (R), green (G), and blue (B), color light beams. The three color light beams are modulated by the liquid crystal light valves 330R, 330G, and 330 B, which are related to the respective colors. The liquid crystal light valves 330R, 330G, and 330 B include liquid crystal panels 560R, 560G, and 560B and polarizers disposed on the light incident side and light exiting side of the liquid crystal panels 560R, 560G and 560B. The three modulated color light beams are combined in the cross dichroic prism 340. The combined light enters the projection system 350. The projection system 350 projects the incident light on a screen (not shown). An image is thus displayed on the screen.

A variety of known configurations can be applied to the parallelizing lens 305, the illumination system 310, the color separation system 320, the cross dichroic prism 340, and the projection system 350.

Figure 2:
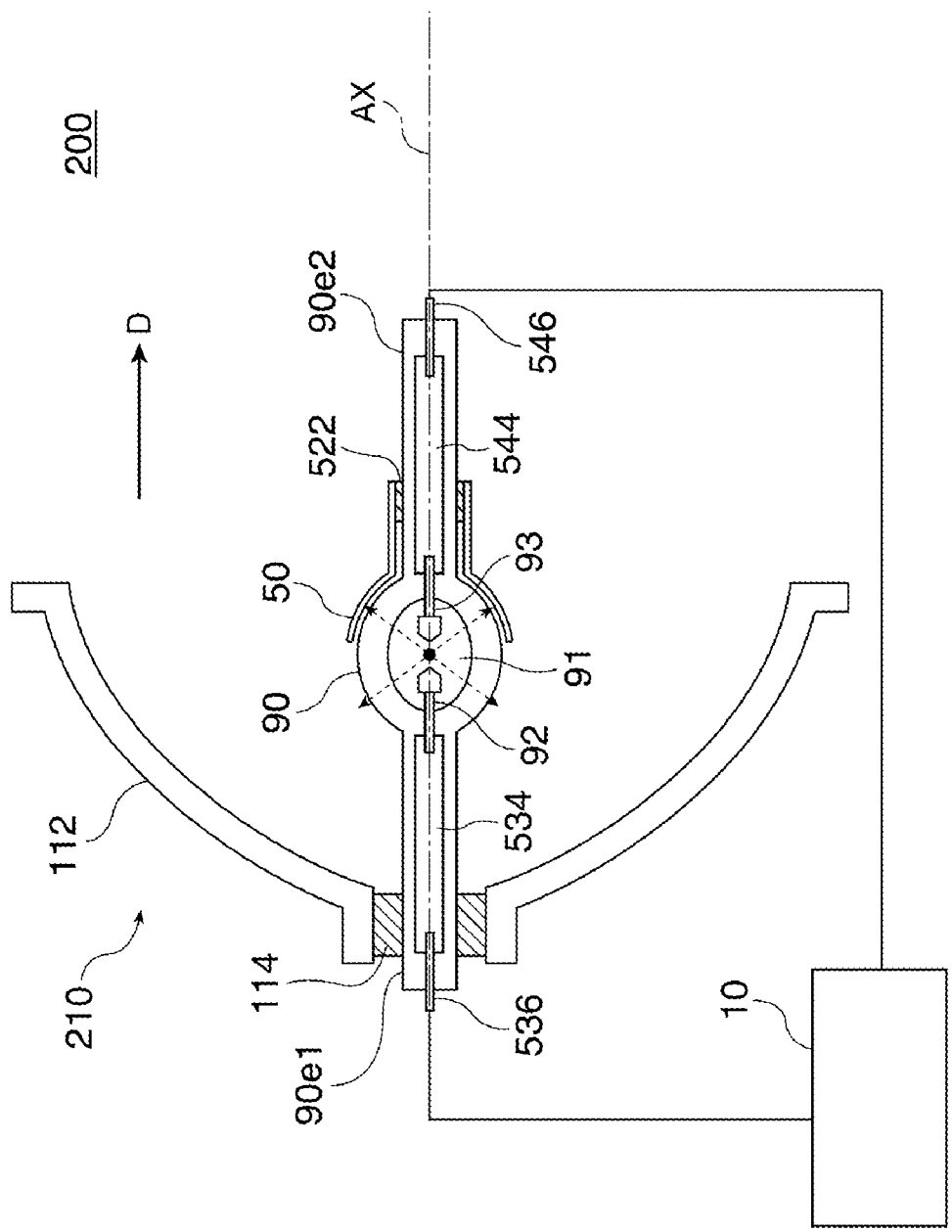
FIG. 2 illustrates an optical system of a projector according to at least one embodiment.

FIG. 2 is a descriptive diagram illustrating the configuration of the light source 200. The light source 200 includes the light source unit 210 and the discharge lamp lighting apparatus 10. FIG. 2 shows a cross-sectional view of the light source unit 210. The light source unit 210 includes the primary reflection mirror 112, the discharge lamp 90, and a secondary mirror 50.

The discharge lamp 90 has a rod shape extending from a first end 90e1 to a second end 90e2 along the illumination direction D. The discharge lamp 90 is made of quartz glass or any other suitable light-transmissive material. The central portion of the discharge lamp 90 is spherically convex, where a discharge space 91 is formed. The discharge space 91 encapsulates gas, which is a discharge medium containing a rare gas, a metallic halide compound, and other materials.

Two electrodes 92 and 93 protrude from the discharge lamp 90 into the discharge space 91. The first electrode 92 is disposed on the first end 90e1 side in the discharge space 91, whereas the second electrode 93 is disposed on the second end 90e2 side in the discharge space 91. Each of the electrodes 92 and 93 has a rod shape extending along the optical axis AX. Electrode tips (also called "discharge ends") of the electrodes 92 and 93 face each other in the discharge space 91 and are spaced apart by a predetermined distance. The electrodes 92 and 93 are made of tungsten or any other suitable metal.

A first terminal 536 is provided at the first end 90e1 of the discharge lamp 90. The first terminal 536 is electrically connected to the first electrode 92 via a conductive member 534 that passes inside the discharge lamp 90. Similarly, a second terminal 546 is provided at the second end 90e2 of the discharge lamp 90. The second terminal 546 is electrically connected to the second electrode 93 via a conductive member 544 that passes inside the discharge lamp 90. Each of the terminals 536 and 546 is made of tungsten or any other suitable metal. Each of the conductive members 534 and 544 is formed of, for example, a molybdenum foil.

The terminals 536 and 546 are connected to the discharge lamp lighting apparatus 10. The discharge lamp lighting apparatus 10 supplies an AC current to the terminals 536 and 546. As a result, arc discharge occurs between the two electrodes 92 and 93. The light produced by the arc discharge (discharged light) is radiated from the discharge position in every direction, as indicated by the broken-line arrows.

The primary reflection mirror 112 is fixed with a fixing member 114 to the first end 90e1 of the discharge lamp 90. The reflection surface of the primary reflection mirror 112 (the surface facing the discharge lamp 90) has a spheroidal shape. The primary reflection mirror 112 reflects the discharged light in the illumination direction D. The reflection surface of the primary reflection mirror 112 does not necessarily have a spheroidal shape but can have a variety of shapes that reflect the discharged light in the illumination direction D. For example, a paraboloidal shape may be used. In this case, the primary reflection mirror 112 can convert the discharged light into light substantially parallel to the optical axis AX. The parallelizing lens 305 can therefore be omitted.

The secondary mirror 50 is fixed with a fixing member 522 on the second end 90e2 side of the discharge lamp 90. The reflection surface (the surface facing the discharge lamp 90) of the secondary mirror 50 has a spherical shape that surrounds the second end 90e2 side of the discharge space 91. The secondary mirror 50 reflects the discharged light toward the primary reflection mirror 112. The above configuration allows the light radiated from the discharge space 91 to be more efficiently used.

The fixing members 114 and 522 can be made of an arbitrary heat-resistant material (an inorganic adhesive, for example) that withstands the heat produced in the discharge lamp 90. As a method for securely arranging the primary reflection mirror 112 and the secondary reflection mirror 50 with respect to the discharge lamp 90, the primary reflection mirror 112 and the secondary reflection mirror 50 are not necessarily fixed to the discharge lamp 90, but an arbitrary method can be employed. For example, the discharge lamp 90 and the primary reflection mirror 112 may be independently fixed to an enclosure (not shown) of the projector. The same argument applies to the secondary mirror 50.

Discharge Lamp Lighting Apparatus According to First Embodiment

Example of Circuit Configuration of Discharge Lamp Lighting Apparatus

Figure 3:
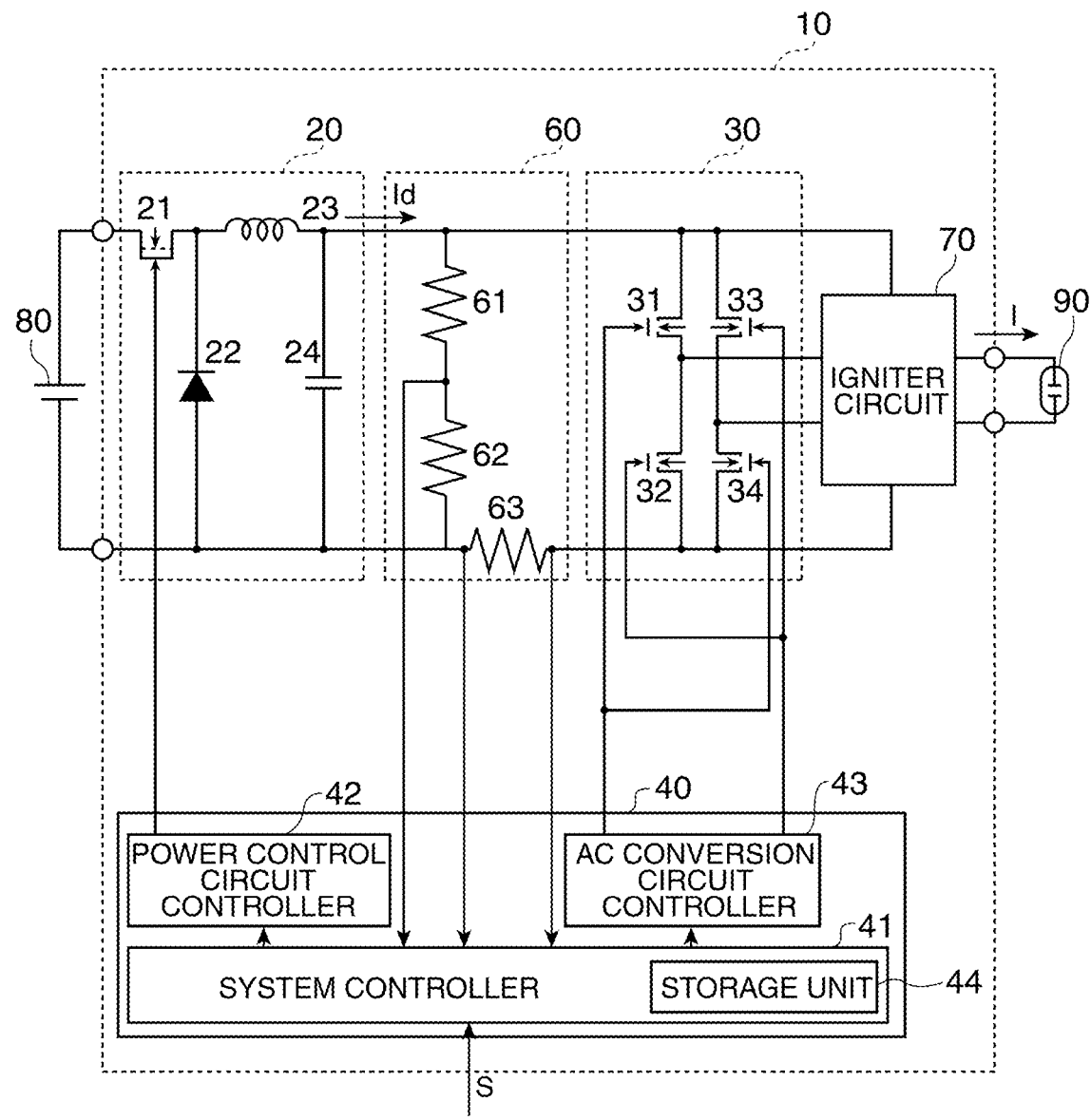
FIG. 3 illustrates a circuit configuration of a discharge lamp lighting apparatus according to at least one embodiment.

FIG. 3 is an example of the circuit diagram of the discharge lamp lighting apparatus according to the present embodiment.

The discharge lamp lighting apparatus 10 includes a power control circuit 20. The power control circuit 20 controls driving power supplied to the discharge lamp 90. In the present embodiment, the power control circuit 20 is comprised of a down chopper circuit that uses a DC power supply 80 as an input source, lowers the input voltage, and outputs a DC current Id.

The power control circuit 20 may include a switching device 21, a diode 22, a coil 23, and a capacitor 24. The switching device 21 may be comprised of a transistor or any other suitable component. In the present embodiment, one end of the switching device 21 is connected to the positive voltage side of the DC power supply 80, and the other end is connected to the cathode terminal of the diode 22 and one end of the coil 23. The other end of the coil 23 is connected to one end of the capacitor 24, and the other end of the capacitor 24 is connected to the anode terminal of the diode 22 and the negative voltage side of the DC power supply 80. A current control signal is inputted from a controller 40 to a control terminal of the switching device 21 to control ON and OFF of the switching device 21. The current control signal may be a PWM control signal or any other suitable signal.

When the switching device 21 is turned on, a current flows through the coil 23, and energy is stored in the coil 23. When the switching device 21 is then turned off, the energy stored in the coil 23 is discharged through a path passing through the capacitor 24 and the diode 22. This produces the DC current Id proportional to the period during which the switching device 21 is kept ON.

The discharge lamp lighting apparatus 10 further includes an AC conversion circuit 30. The AC conversion circuit 30 receives as an input the DC current Id outputted from the power control circuit 20, and reverses the polarity of the DC current Id at predetermined timings to produce and output a discharge lamp driving current having an arbitrary frequency and duty ratio. In a discharge lamp driving AC current I whose polarity is switched between a first polarity and a second polarity, the duty ratio is defined as the proportion of the period of the first polarity to one cycle of the discharge lamp driving AC current I. In the present embodiment, the AC conversion circuit 30 is comprised of an inverter bridge circuit (full-bridge circuit).

The AC conversion circuit 30 includes, for example, first to fourth switching devices 31 to 34, such as transistors, and the first and second switching devices 31, 32 connected in series are connected in parallel to the third and fourth switching devices 33, 34 connected in series. Frequency control signals are inputted from the controller 40 to control terminals of the first to fourth switching devices 31 to 34 to control ON and OFF of the first to fourth switching devices 31 to 34.

The AC conversion circuit 30 alternately reverses the polarity of the DC current Id outputted from the power control circuit 20 by repeatedly turning the first and fourth switching devices 31, 34 and the second and third switching devices 32, 33 alternately on and off so as to produce the discharge lamp driving AC current I having a controlled frequency and duty ratio and output it from a common connection point between the first and second switching devices 31, 32 and a common connection point between the third and fourth switch devices 33, 34.

That is, when the first and fourth switching devices 31, 34 are ON, the second and third switching devices 32, 33 are controlled to be OFF, whereas when the first and fourth switching devices 31, 34 are OFF, the second and third switching devices 32, 33 are controlled to be ON. Therefore, when the first and fourth switching devices 31, 34 are ON, the produced discharge lamp driving AC current I flows from one end of the capacitor 24 through the first switching device 31, the discharge lamp 90, and the fourth switching device 34 in this order. On the other hand, when the second and third switching devices 32, 33 are ON, the produced discharge lamp driving AC current I flows from one end of the capacitor 24 through the third switching device 33, the discharge lamp 90, and the second switching device 32 in this order.

The discharge lamp lighting apparatus 10 further includes the controller 40. The controller 40 controls the power control circuit 20 and the AC conversion circuit 30 to control the magnitude, frequency, duty ratio, and waveform of the discharge lamp driving AC current I. The control circuit 40 controls the AC conversion circuit 30 to perform AC conversion control, and controls the power control circuit 20 to perform section current control. In the AC conversion control, the timings at which the polarity of the discharge lamp driving AC current I is reversed are used to control the frequency and the duty ratio. In the section current control, the magnitude of the outputted DC current Id is controlled.

In the section current control, the controller 40 externally receives a power control signal S and sets the average of the DC current Id outputted from the power control circuit 20 to the current magnitude that corresponds to the power control signal S. The power control signal S may be a signal whose value continuously changes, such as a signal based on user's dimming operation, or a signal whose value discretely changes, such as a signal based on user's mode switching operation (for example, switching between a high-luminance mode driven at a high power level and a long-life mode driven at a low power level).

The configuration of the controller 40 is not limited to a specific one. The controller 40 in the present embodiment includes a system controller 41, a power control circuit controller 42, and an AC conversion circuit controller 43. Part or all of the controller 40 may be comprised of a semiconductor integrated circuit.

The system controller 41 controls the power control circuit controller 42 and the AC conversion circuit controller 43 to control the power control circuit 20 and the AC conversion circuit 30. The system controller 41 may control the power control circuit controller 42 and the AC conversion circuit controller 43 based on the discharge lamp driving voltage and the discharge lamp driving AC current I detected by an operation detector 60, which will be described later, provided in the discharge lamp lighting apparatus 10.

In the present embodiment, the system controller 41 further includes a storage unit 44. The storage unit 44 may be provided independently of the system controller 41.

The system controller 41 may control the power control circuit 20 and the AC conversion circuit 30 based on information stored in the storage unit 44. The storage unit 44 may store, for example, information on the magnitude, frequency, duty ratio, and waveform of the discharge lamp driving AC current I.

The power control circuit controller 42 outputs the current control signal to the power control circuit 20 based on a control signal from the system controller 41 so as to control the power control circuit 20.

The AC conversion circuit controller 43 outputs a reverse control signal to the AC conversion circuit 30 based on a control signal from the system controller 41 so as to control the AC conversion circuit 30.

The discharge lamp lighting apparatus 10 may include the operation detector 60. The operation detector 60 may detect the operation of the discharge lamp 90, for example, the discharge lamp driving voltage and the discharge lamp driving AC current I, and output driving voltage information and driving current information. In the present embodiment, the operation detector 60 includes first to third resistors 61 to 63.

The operation detector 60 detects the discharge lamp driving voltage using the voltages divided by the first and second resistors 61, 62 connected in parallel to the discharge lamp 90 and connected in series to each other, and detects the discharge lamp driving AC current I using the voltage produced in the third resistor 63 connected in series to the discharge lamp 90.

The discharge lamp lighting apparatus 10 may include an igniter circuit 70. The igniter circuit 70 operates only when the discharge lamp 90 is turned on, and supplies a high voltage (a voltage higher than that in a typical control operation) between the electrodes of the discharge lamp 90, the high voltage required to cause dielectric breakdown between the electrodes of the discharge lamp 90 to form a discharge path when the discharge lamp 90 is turned on. In the present embodiment, the igniter circuit 70 is connected in parallel to the discharge lamp 90.

Figure 4:
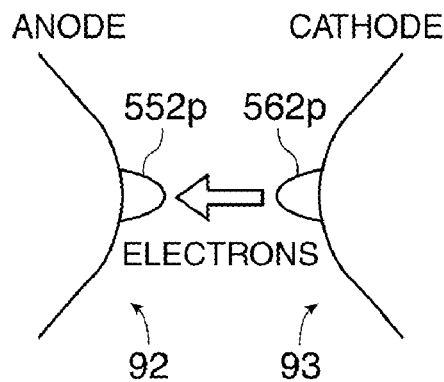
FIGS. 4A to 4D illustrate the relationship between the polarity of the driving power and the temperature of the electrodes according to at least one embodiment.
Figure 4:
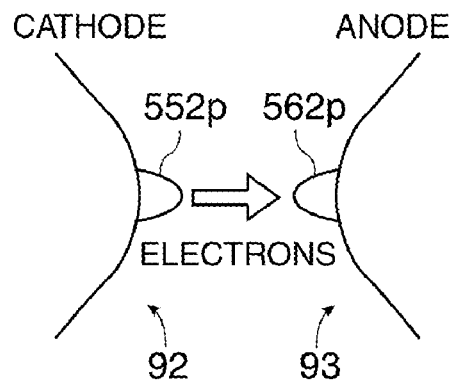
Figure 4:
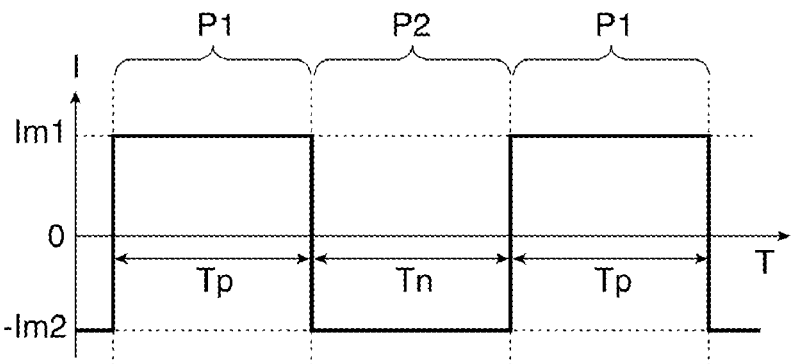
Figure 4:
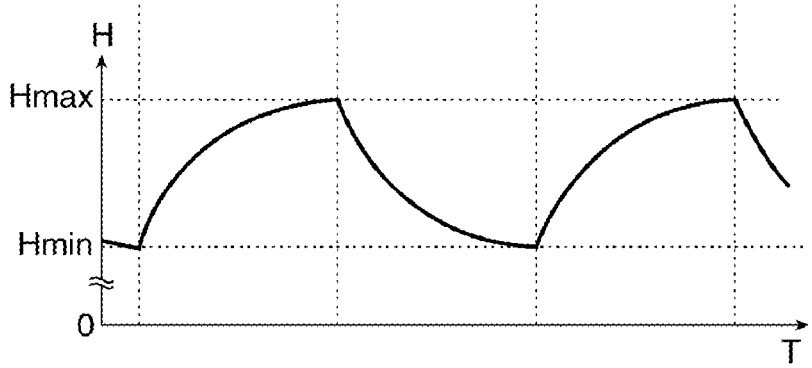

FIGS. 4A to 4D are descriptive diagrams illustrating the relationship between the polarity of the driving power supplied to the discharge lamp 90 and the temperature of the electrodes. FIGS. 4A and 4B show how the two electrodes 92 and 93 operate. FIGS. 4A and 4B show the tips of the two electrodes 92 and 93. Protrusions 552P and 562P are provided at the tips of the electrodes 92 and 93, respectively. Discharge occurs between the protrusions 552P and 562P. In the present embodiment, the shift of the discharge position (arc position) in each of the electrodes 92 and 93 can be suppressed as compared to a case where no protrusions are provided. It is noted, however, that such protrusions may be omitted.

FIG. 4A shows a first polarity state P1 in which the first electrode 92 acts as the anode and the second electrode 93 acts as the cathode. In the first polarity state P1, discharge causes electrons to move from the second electrode 93 (cathode) to the first electrode 92 (anode). The cathode (second electrode 93) discharges electrons. The electrons discharged from the cathode (second electrode 93) impinge on the tip of the anode (first electrode 92). The impingement produces heat, which increases the temperature at the tip (protrusion 552P) of the anode (first electrode 92).

FIG. 4B shows a second polarity state P2 in which the first electrode 92 acts as the cathode and the second electrode 93 acts as the anode. In the second polarity state P2, electrons move from the first electrode 92 to the second electrode 93 in contrast to the first polarity state P1. As a result, the temperature at the tip (protrusion 562P) of the second electrode 93 increases.

As described above, the temperature of the anode readily becomes higher than that of the cathode. When the temperature of one of the electrodes continues to be higher than that of the other electrode, a variety of problems may occur. For example, when the tip of the hot-side electrode melts excessively, the electrode may suffer from an unexpected deformation. As a result, the arc length may deviate from an adequate value. When the tip of the cold-side electrode melts insufficiently, tiny irregularities produced at the tip may not melt but remain. As a result, what is called an arc jump may occur (the arc position is not stable but moved).

To prevent such a problem, it is possible to use AC driving in which the polarities of the electrodes are repeatedly switched. FIG. 4C is a timing chart illustrating AC power (drive signal) supplied to the discharge lamp 90 (FIG. 2). The horizontal axis represents the time T, and the vertical axis represents the current I. The current I represents the current flowing through the discharge lamp 90. Positive values represent the first polarity state P1, whereas negative values represent the second polarity state P2. In the example shown in FIG. 4C, a rectangular-wave AC current is used, and the first polarity state P1 and the second polarity state P2 are alternately repeated. A first polarity section Tp represents a period during which the first polarity state P1 continues, and a second polarity section Tn is a period during which the second polarity state P2 continues. The average current magnitude in the first polarity section Tp is +A0, and the average current magnitude in the second polarity section Tn is −A0. The drive frequency can be experimentally determined in accordance with the characteristics of the discharge lamp 90 (a value within a range from 30 Hz to 1 KHz is used, for example). The other values +A0, −A0, Tp, and Tn can be experimentally determined as well.

FIG. 4D is a timing chart illustrating the change in the temperature of the first electrode 92. The horizontal axis represents the time T, and the vertical axis represents the temperature H. In the first polarity state P1, the temperature H of the first electrode 92 increases, whereas in the second polarity state P2, the temperature H of the first electrode 92 decreases. Since the first polarity state P1 and the second polarity state P2 are alternately repeated, the temperature H periodically changes between a minimum value Hmin and a maximum value Hmax. Although not illustrated, the temperature of the second electrode 93 changes in opposite phase to the temperature H of the first electrode 92. That is, the temperature of the second electrode 93 decreases in the first polarity state P1, whereas the temperature of the second electrode 93 increases in the second polarity state P2.

In the first polarity state P1, since the tip of the first electrode 92 (protrusion 552P) melts, the tip of the first electrode 92 (protrusion 552P) becomes smooth. The discharge position in the first electrode 92 will not therefore be shifted. On the other hand, since the temperature at the tip of the second electrode 93 (protrusion 562P) decreases, the second electrode 93 (protrusion 562P) will not melt excessively. No unexpected electrode deformation will therefore occur. In the second polarity state P2, the behaviors of the first electrode 92 and the second electrode 93 are reversed. The problems with the two electrodes 92 and 93 can therefore be eliminated by repeating the two states P1 and P2.

When the waveform of the current I is symmetric, that is, when the waveform of the current I satisfies the conditions "|+A0|=|−A0|, Tp=Tn," the conditions of the power supplied to the two electrodes 92 and 93 are the same. The difference in temperature between the two electrodes 92 and 93 is therefore expected to be small. However, when such symmetric current waveform-based driving continues, steady convection occurs in the discharge space 91, and the electrode material is deposited or precipitated locally on the shafts of the electrodes and grows into needle-like projections, possibly leading to unexpected discharge toward the wall of the light-transmissive material that surrounds the discharge space 91. Such unexpected discharge causes degradation of the inner wall and reduction in life of the discharge lamp 90. Further, when such symmetric current waveform-based driving continues, the electrodes are maintained in a fixed temperature distribution for a long time. In this case, the asymmetry of the electrodes resulting from the change in state over time is enhanced with time.

Example of Control of Discharge Lamp Lighting Apparatus

A description will be made of a specific example of control of the discharge lamp lighting apparatus 10 according to the present embodiment.

The controller 40 in the discharge lamp lighting apparatus 10 according to the present embodiment performs control in which accumulated energy supplied to the electrodes 92 and 93 of the discharge lamp in one cycle of the discharge lamp driving AC current I is changed in accordance with a periodic pattern. The periodic pattern includes a plurality of segmented periods during each of which the accumulated energy supplied to the electrodes 92 and 93 of the discharge lamp is maintained at the same level for a plurality of cycles of the discharge lamp driving AC current I, and the accumulated energy levels supplied to the electrodes 92 and 93 of the discharge lamp in at least two of the segmented periods differ from each other.

Further, the controller 40 performs current control in which the controller 40 externally receives a power control signal S and sets the average of the DC current Id outputted from the power control circuit 20 in the section that corresponds to one cycle of the discharge lamp driving AC current I to the current magnitude that corresponds to the power control signal S. At the same time, the controller 40 controls the magnitude of the accumulated energy supplied to the electrodes 92 and 93 of the discharge lamp in relation to the average of the DC current Id. For example, the controller 40 may increase the difference between the maximum value and the minimum value of the accumulated energy supplied to the electrodes 92 and 93 of the discharge lamp as the average of the DC current Id decreases.

The accumulated energy is the energy that corresponds to the amount of power supplied from the discharge lamp lighting apparatus in the period during which either of the electrodes 92 and 93 acts as the anode.

According to the control described above, the accumulated energy supplied to the electrodes 92 and 93 of the discharge lamp 90 in one cycle of the discharge lamp driving AC current I is changed in accordance with a periodic pattern including a plurality of segmented periods during each of which the accumulated energy supplied to the electrodes 92 and 93 of the discharge lamp 90 in one cycle of the discharge lamp driving AC current I is maintained at the same level for a plurality of cycles of the discharge lamp driving AC current I. Therefore, the accumulated energy supplied to the electrodes of the discharge lamp 90 in one cycle of the AC current I is changed in the periodic pattern including a plurality of segmented periods, whereas the accumulated energy supplied to the electrodes of the discharge lamp 90 in one cycle of the AC current I can be temporarily fixed in at least one of the segmented periods.

That is, the thermal condition in the electrodes 92 and 93 and in the vicinity thereof can be greatly changed in a relatively long time scale. It is therefore possible to suppress the formation of steady convection in the discharge lamp 90 so as to prevent uneven consumption of the electrodes 92 and 93 and uneven precipitation of the electrode material.

Of the electrodes 92 and 93 of the discharge lamp 90, the temperature of the electrode that receives lower accumulated energy supplied in one cycle is lower than that of the other. In particular, when the power for driving the discharge lamp 90 is low, the power (energy) supplied to the electrodes 92 and 93 is low, and hence the electrode temperature is low. The power for driving the discharge lamp 90 is proportional to the DC current Id.

In the control of the discharge lamp lighting apparatus 10 according to the present embodiment, controlling the magnitude of the accumulated energy supplied to the electrodes 92 and 93 of the discharge lamp in relation to the average of the DC current Id, that is, the power for driving the discharge lamp 90 allows the electrode temperature to vary in the largest possible range even when the discharge lamp is driven at a low power level. It is therefore possible to suppress the formation of steady convection in the discharge lamp 90 so as to prevent uneven consumption of the electrodes 92 and 93 and uneven precipitation of the electrode material. For example, increasing the difference between the maximum value and the minimum value of the accumulated energy supplied to the electrodes 92 and 93 of the discharge lamp allows the electrode temperature to vary in the largest possible range even when the discharge lamp is driven at a low power level.

The accumulated energy supplied to the electrodes 92 and 93 may be controlled by using the duty ratio of the discharge lamp driving AC current I or may be controlled by using the magnitude of the discharge lamp driving AC current I.

A description will be made of the case where the accumulated energy supplied to the electrodes 92 and 93 is controlled by using the duty ratio of the discharge lamp driving AC current I with reference to FIGS. 1 to 8. The duty ratio of the discharge lamp driving AC current I is the proportion of the first polarity section Tp to one cycle of the AC current I.

In this case, the controller 40 performs AC conversion control in which the duty ratio of the discharge lamp driving AC current I is changed in accordance with a periodic pattern. The periodic pattern includes a plurality of segmented periods during each of which the duty ratio of the discharge lamp driving AC current I is maintained at the same value for a plurality of cycles of the discharge lamp driving AC current I, and the duty ratios of the discharge lamp driving AC current I in at least two of the segmented periods differ from each other.

Now, let a first polarity of the discharge lamp driving AC current I be a case where the first electrode 92 of the discharge lamp 90 is the anode, and a second polarity be a case where the first electrode 92 is the cathode. The duty ratio is the proportion of the period of the first polarity to one cycle of the discharge lamp driving AC current whose polarity is switched between the first polarity and the second polarity.

Further, the controller 40 performs current control in which the controller 40 externally receives a power control signal S and sets the average of the DC current Id outputted from the power control circuit 20 in the section that corresponds to one cycle of the discharge lamp driving AC current to the current magnitude that corresponds to the power control signal S. At the same time, the controller 40 performs AC conversion control in which the difference between at least one of the maximum and minimum values of the duty ratio of the discharge lamp driving AC current I and a reference duty ratio is controlled in relation to the average of the DC current Id outputted from the power control circuit 20. For example, the controller 40 may perform the AC conversion control as follows: The difference between at least one of the maximum and minimum values of the duty ratio of the discharge lamp driving AC current I and a reference duty ratio is increased as the average of the DC current Id, that is, the power for driving the discharge lamp 90 decreases.

Figure 5:
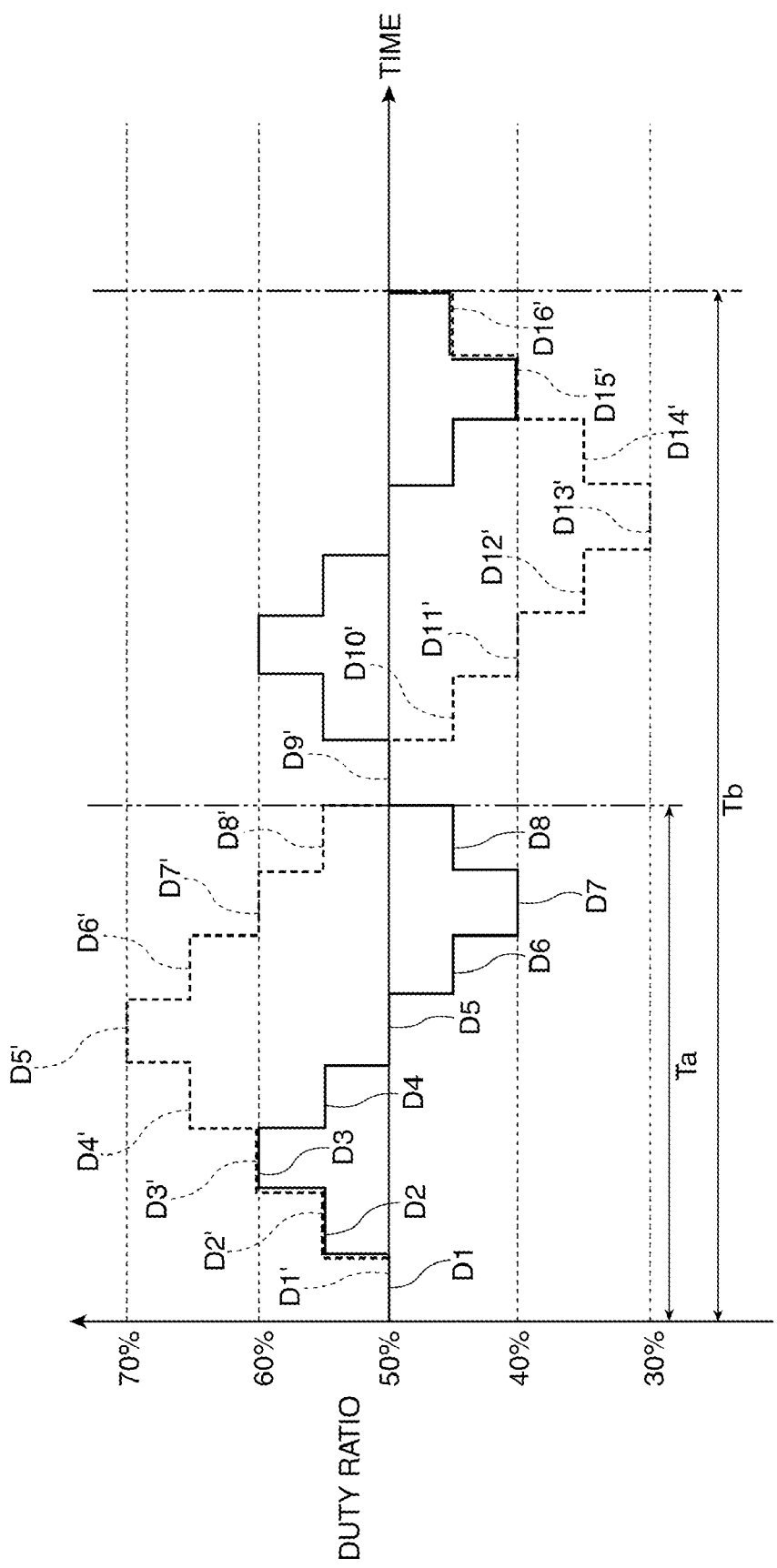
FIG. 5 illustrates an example of control of a discharge lamp lighting apparatus according to at least one embodiment.

FIG. 5 shows an example of the periodic pattern in accordance with which the duty ratio of the discharge lamp driving AC current I is changed. The horizontal axis represents time, and the vertical axis represents the duty ratio. The solid line represents a first periodic pattern in a case where the power for driving the discharge lamp 90 is 200 W, and the broken line represents a second periodic pattern in a case where the power for driving the discharge lamp 90 is 160 W. In the present embodiment, the reference duty ratio is 50%. The driving power of 200 W is the effective average power per cycle of the first periodic pattern, and the driving power of 160 W is the effective average power per cycle of the second periodic pattern.

When the power for driving the discharge lamp 90 is 200 W, the controller 40 performs AC conversion control in which one cycle Ta of the first periodic pattern includes 8 segmented periods (segmented periods D1 to D8) during each of which the duty ratio of the discharge lamp driving AC current I is maintained at the same value and the duty ratio is changed stepwise. That is, any of the segmented periods is a period during which the same AC conversion control continues in terms of one cycle unit of the discharge lamp driving AC current I. In the present embodiment, the length of one segmented period in the first periodic pattern is 8 seconds.

Similarly, when the power for driving the discharge lamp 90 is 160 W, the controller 40 performs AC conversion control in which one cycle Tb of the second periodic pattern includes 16 segmented periods (segmented periods D1' to D16') during each of which the duty ratio of the discharge lamp driving AC current I is maintained at the same value and the duty ratio is changed stepwise. In the present embodiment, the length of one segmented period in the second periodic pattern is 8 seconds, as in the case where the power for driving the discharge lamp 90 is 200 W.

A description will be made of the control in the case where the power for driving the discharge lamp 90 is 200 W. In this case, the duty ratio is 50% in the segmented period D1, and then the duty ratio is incremented by 5% to 60%, which is the maximum, in the segmented period D3. The duty ratio is then decremented by 5% to 40%, which is the minimum, in the sectioned period D7. The duty ratio is again incremented by 5%. The duty ratio is thus repeatedly incremented and decremented in the cycle of Ta.

Similarly, a description will be made of the control in the case where the power for driving the discharge lamp 90 is 160 W. In this case, the duty ratio is 50% in the segmented period D1', and then the duty ratio is incremented by 5% to 70%, which is the maximum, in the sectioned period D5'. The duty ratio is then decremented by 5% to 30%, which is the minimum, in the sectioned period D13'. The duty ratio is again incremented by 5%. The duty ratio is thus repeatedly incremented and decremented in the cycle of Tb.

That is, in the present embodiment, when the power for driving the discharge lamp 90 is 200 W, both the maximum value (60%) and minimum value (40%) of the duty ratio of the discharge lamp driving AC current I differ from the reference duty ratio (50%) by 10%. When the power for driving the discharge lamp 90 is 160 W, both the maximum value (70%) and minimum value (30%) of the duty ratio of the discharge lamp driving AC current I differ from the reference duty ratio (50%) by 20%.

Figure 6A:
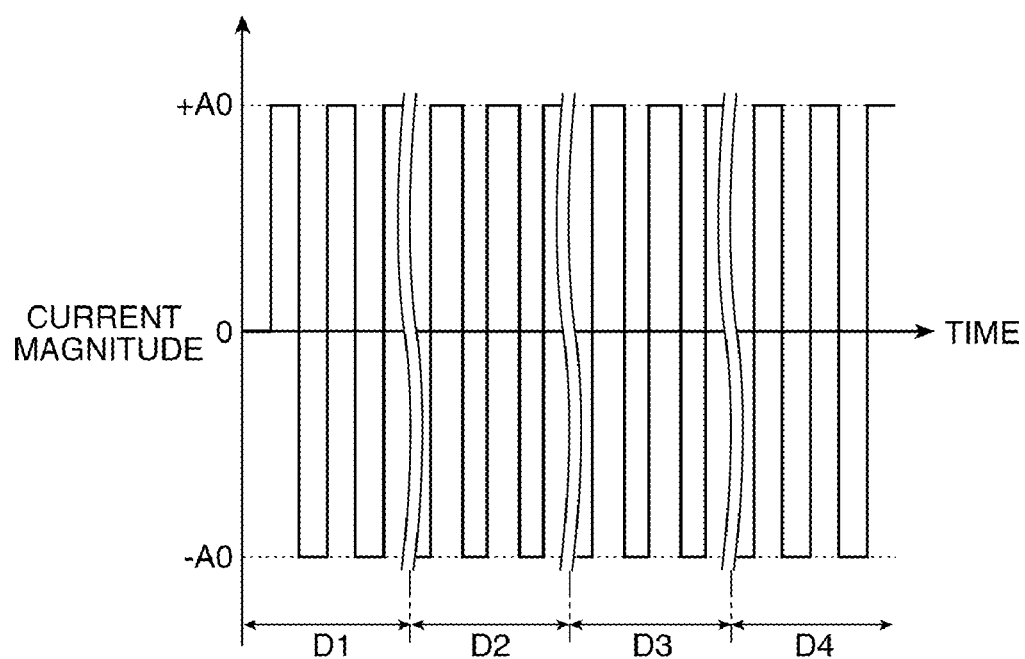
FIGS. 6A and 6B illustrate an example of control of a discharge lamp lighting apparatus according to at least one embodiment.
Figure 6B:
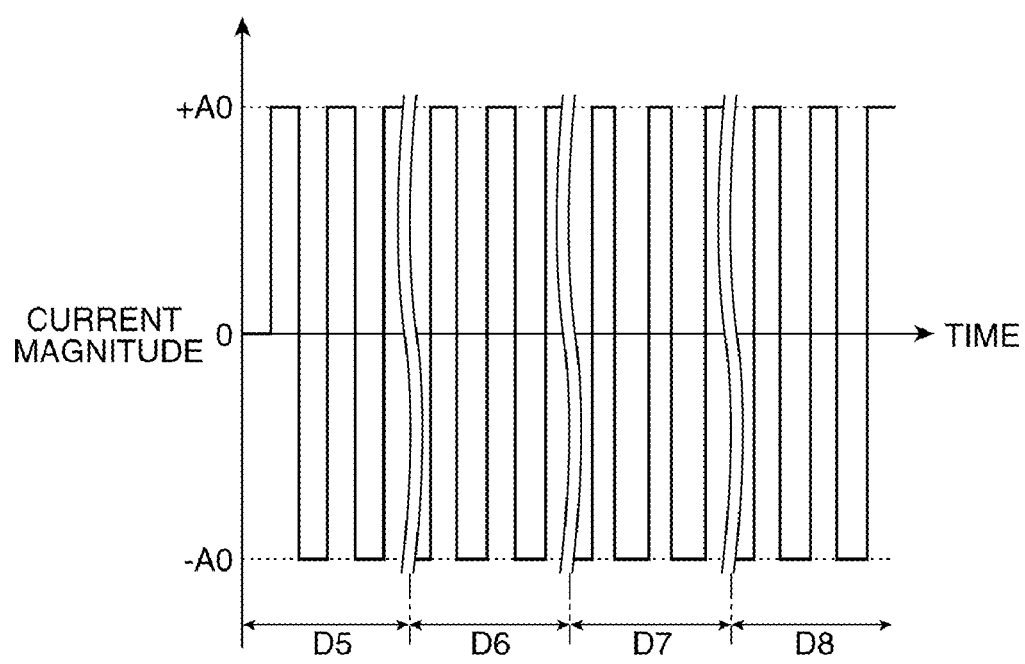
Figure 7:
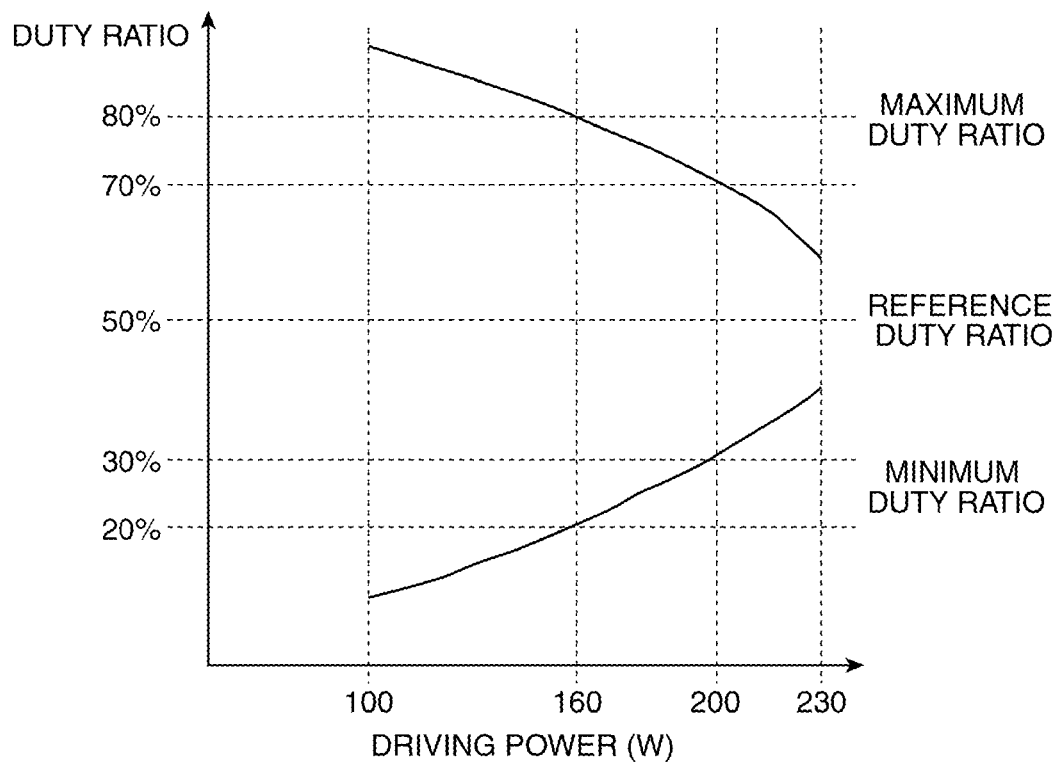
FIG. 7 illustrates an example of control of a discharge lamp lighting apparatus according to at least one embodiment.

FIGS. 6A and 6B show the transition of the waveform of the discharge lamp driving AC current I when the duty ratio is changed in accordance with one of the periodic patterns shown in FIG. 5. The horizontal axis represents time, and the vertical axis represents the current magnitude. In the present embodiment, the current control is performed in such a way that the average current magnitude for the first polarity is +A0 and the average current magnitude for the second polarity is −A0. While the following description will be made of the transition of the waveform when the power for driving the discharge lamp 90 is 200 W, the transition of the waveform when the power for driving the discharge lamp 90 is 160 W will be the same except the number of segmented periods and the maximum and minimum values of the duty ratio.

FIG. 6A shows the transition of the waveform of the AC current I from the segmented period D1 to the segmented period D4 in FIG. 5. In the segmented period D1, the current waveform whose duty ratio is 50% continues. In the segmented period D2, the current waveform is changed to the one whose duty ratio is 55%, which continues for the segmented period D2. In the segmented period D3, the current waveform is changed to the one whose duty ratio is 60%, which continues for the segmented period D3. In the segmented period D4, the current waveform is changed to the one whose duty ratio is 55%, which continues for the segmented period D4.

FIG. 6B shows the transition of the waveform of the AC current I from the segmented period D5 to the segmented period D8 in FIG. 5. In the segmented period D5, the current waveform whose duty ratio is 50% continues. In the segmented period D6, the current waveform is changed to the one whose duty ratio is 45%, which continues for the segmented period D6. In the segmented period D7, the current waveform is changed to the one whose duty ratio is 40%, which continues for the segmented period D7. In the segmented period D8, the current waveform is changed to the one whose duty ratio is 45%, which continues for the segmented period D8.

To suppress the formation of steady convection associated with light emission in a discharge lamp, it is desirable to change the electrode temperature within the largest possible range. When the power for driving the discharge lamp 90 is low, however, the power (energy) supplied to the electrodes 92 and 93 is low, and hence the electrode temperature varies within a small range. The power for driving the discharge lamp 90 is proportional to the DC current Id.

In the control of the discharge lamp lighting apparatus 10 according to the present embodiment, controlling the difference between at least one of the maximum and minimum values of the duty ratio of the discharge lamp driving AC current I and the reference duty ratio in relation to the average of the DC current Id, that is, the power for driving the discharge lamp 90 allows the electrode temperature to vary in the largest possible range even when the discharge lamp is driven at a low power level.

It is therefore possible to suppress the formation of steady convection in the discharge lamp 90 so as to prevent uneven consumption of the electrodes 92 and 93 and uneven precipitation of the electrode material. For example, increasing the difference between at least one of the maximum and minimum values of the duty ratio of the discharge lamp driving AC current I and the reference duty ratio allows the electrode temperature to vary in the largest possible range even when the discharge lamp is driven at a low power level.

While the present embodiment has been described with reference to the two cases where the power for driving the discharge lamp 90 is 200 W and 160 W, the power for driving the discharge lamp 90 may be changed continuously or stepwise at a finer rate based on the power control signal S. In this case, for example, as indicated by the graphs shown in FIG. 7, the relationship between the range of the power for driving the discharge lamp 90 and the range of the duty ratio may be determined in advance, and the relationship data may be stored, for example, in the storage unit 44 in the controller 40.

Variation

While the above embodiment has been described with reference to the case where the maximum and minimum values of the duty ratio of the discharge lamp driving AC current I differ from the reference duty ratio by the same amount, one of the differences may be larger than the other.

In some structures, the temperature of one of the electrodes less likely decreases than the temperature of the other does. An example of such a structure is that shown in FIG. 2, where the secondary reflective mirror 50 covers the portion of the discharge lamp 90 that is on the second electrode 93 side. In this case, to more greatly change the temperature of the first electrode 92, which more likely decreases than the temperature of the second electrode 93, only one of the maximum and minimum values of the duty ratio of the discharge lamp driving AC current I may differ from the reference duty ratio by a greater amount so that the maximum value of the proportion of the period during which the first electrode 92 acts as the anode to one cycle of the AC current I is greater than the maximum value of the proportion of the period during which the second electrode 93 acts as the anode to one cycle of the AC current I.

For example, the AC conversion control may be performed as follows: When the driving power is 200 W, the maximum value of the duty ratio is 60% (the difference from the reference duty ratio is 10%) and the minimum value of the duty ratio is 40% (the difference from the reference duty ratio is 10%), whereas when the driving power is 160 W, the maximum value of the duty ratio is 60% (the difference from the reference duty ratio is 10%) and the minimum value of the duty ratio is 30% (the difference from the reference duty ratio is 20%).

Further, while the frequency of the discharge lamp driving AC current I is fixed in the control in the above embodiment, the controller 40 may perform the AC conversion control as follows: The frequency of the discharge lamp driving AC current I is controlled in relation to the average of the DC current Id outputted from the power control circuit 20. For example, the controller 40 may perform the AC conversion control as follows: The frequency of the discharge lamp driving AC current I is increased as the average of the DC current Id outputted from the power control circuit 20 decreases.

Figure 8:
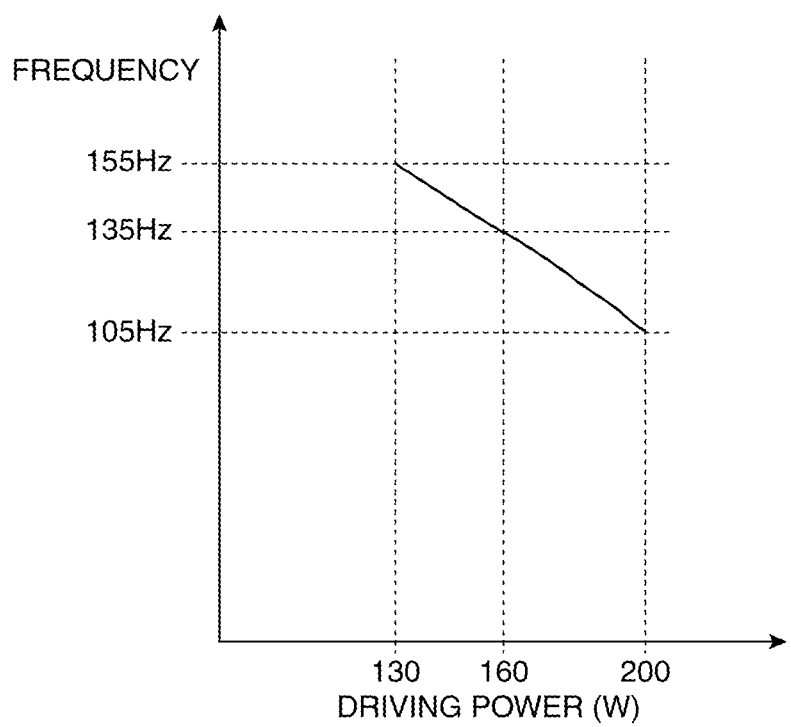
FIG. 8 illustrates an example of control of a discharge lamp lighting apparatus according to at least one embodiment.

In this case, for example, as indicated by the graph shown in FIG. 8, the relationship between the power for driving the discharge lamp 90 and the frequency of the discharge lamp driving AC current I may be determined in advance, and the relationship data may be stored, for example, in the storage unit 44 in the controller 40.

As described above, the control of increasing the difference between at least one of the maximum and minimum values of the duty ratio of the discharge lamp driving AC current I and the reference duty ratio when the discharge lamp 90 is driven at a low power level as compared with the case where the discharge lamp 90 is driven at a high power level, in combination with the control of increasing the frequency of the discharge lamp driving AC current I as the magnitude of the DC current Id outputted from the power control circuit 20 decreases, can not only suppress the formation of steady convection in the discharge lamp 90 to prevent uneven consumption of the electrodes and uneven precipitation of the electrode material, but also prevent flickering.

Discharge Lamp Lighting Apparatus According to Second Embodiment

A description will be made of a case where the accumulated energy supplied to the electrodes 92 and 93 is controlled by using the magnitude of the discharge lamp driving AC current I with reference to FIGS. 1 to 4 and FIGS. 8 to 12. The configurations common to those in the first embodiment have the same reference characters and the description thereof will be omitted.

In a discharge lamp lighting apparatus according to the second embodiment, the controller 40 performs section current control in which the difference in the absolute value of the current magnitude between the first polarity section and the second polarity section of the discharge lamp driving AC current I is changed in accordance with a periodic pattern. The periodic pattern includes a plurality of segmented periods during each of which the difference in the absolute value of the current magnitude between the first polarity section and the second polarity section is maintained at the same value for a plurality of cycles of the discharge lamp driving AC current I, and the differences in the absolute value of the current magnitude between the first polarity section and the second polarity section in at least two of the segmented periods differ from each other.

Further, the controller 40 performs section current control in which the controller 40 externally receives a power control signal S and sets the average of the DC current Id outputted from the power control circuit 20 in the section that corresponds to one cycle of the discharge lamp driving AC current to the current magnitude that corresponds to the power control signal S, and the difference in the absolute value of the current magnitude between the first polarity section and the second polarity section is controlled in relation to the average of the DC current Id outputted from the power control circuit 20. For example, the controller 40 may perform the section current control as follows: At least one of the absolute values of the maximum and minimum values of the difference in the absolute value of the current magnitude between the first polarity section and the second polarity section is increased as the average of the DC current Id, that is, the power for driving the discharge lamp 90 decreases.

Figure 9:
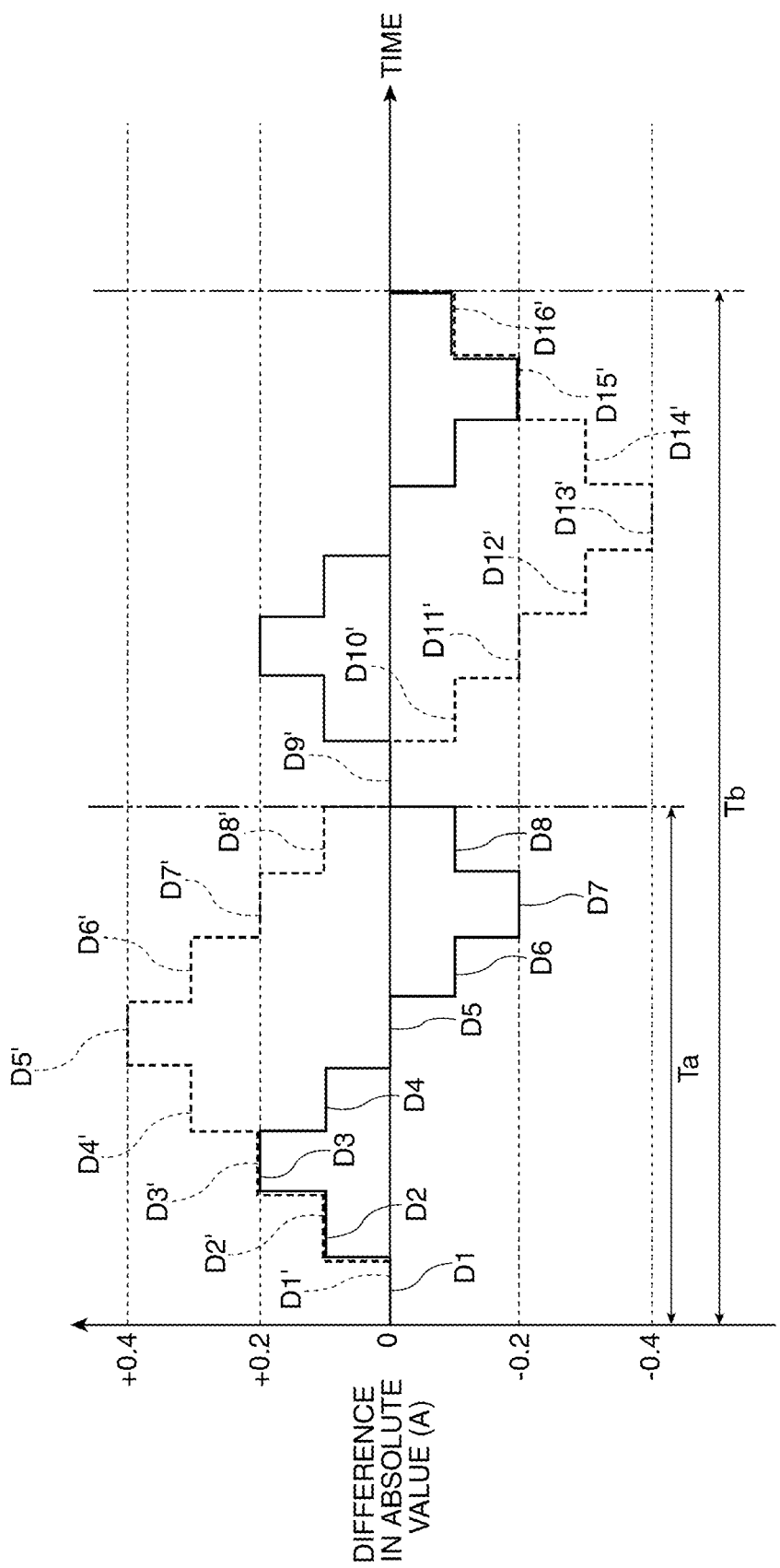
FIG. 9 illustrates an example of control of a discharge lamp lighting apparatus according to at least one embodiment.

FIG. 9 shows an example of the periodic pattern in accordance with which the difference in the absolute value of the current magnitude between the first polarity section and the second polarity section of the discharge lamp driving AC current I is changed. The horizontal axis represents time, and the vertical axis represents the difference in the absolute value of the current magnitude between the first polarity section and the second polarity section of the discharge lamp driving AC current I. The solid line represents a first periodic pattern in a case where the power for driving the discharge lamp 90 is 200 W, and the broken line represents a second periodic pattern in a case where the power for driving the discharge lamp 90 is 160 W.

When the power for driving the discharge lamp 90 is 200 W, the controller 40 performs section current control in which one cycle Ta of the first periodic pattern includes 8 segmented periods (segmented periods D1 to D8) during each of which the difference in the absolute value of the current magnitude between the first polarity section and the second polarity section of the discharge lamp driving AC current I is maintained at the same value, and the difference in the absolute value of the current magnitude between the first polarity section and the second polarity section of the discharge lamp driving AC current I is changed stepwise. That is, any of the segmented periods is a period during which the same section current control continues in terms of one cycle unit of the discharge lamp driving AC current I. In the present embodiment, the length of one segmented period of the first periodic pattern is 8 seconds.

Similarly, when the power for driving the discharge lamp 90 is 160 W, the controller 40 performs section current control in which one cycle Tb of the second periodic pattern includes 16 segmented periods (segmented periods D1' to D16') during each of which the difference in the absolute value of the current magnitude between the first polarity section and the second polarity section of the discharge lamp driving AC current I is maintained at the same value, and the difference in the absolute value of the current magnitude between the first polarity section and the second polarity section of the discharge lamp driving AC current I is changed stepwise. In the present embodiment, the length of one segmented period of the second periodic pattern is 8 seconds, as in the case where the power for driving the discharge lamp 90 is 200 W.

A description will be made of the control in the case where the power for driving the discharge lamp 90 is 200 W. In this case, the difference in the absolute value of the current magnitude between the first polarity section and the second polarity section of the discharge lamp driving AC current I is 0 A in the segmented period D1, and then the difference in the absolute value of the current magnitude between the first polarity section and the second polarity section of the discharge lamp driving AC current I is incremented by 0.1 A to +0.2 A, which is the maximum, in the segmented period D3.

The difference in the absolute value of the current magnitude between the first polarity section and the second polarity section of the discharge lamp driving AC current I is then decremented by 0.1 A to −0.2 A, which is the minimum, in the segmented period D7. The difference in the absolute value of the current magnitude between the first polarity section and the second polarity section of the discharge lamp driving AC current I is again incremented by 0.1 A. The difference in the absolute value of the current magnitude between the first polarity section and the second polarity section of the discharge lamp driving AC current I is thus repeatedly incremented and decremented in the cycle of Ta.

Similarly, a description will be made of the control in the case where the power for driving the discharge lamp 90 is 160 W. In this case, the difference in the absolute value of the current magnitude between the first polarity section and the second polarity section of the discharge lamp driving AC current I is 0 A in the segmented period D1', and then the difference in the absolute value of the current magnitude between the first polarity section and the second polarity section of the discharge lamp driving AC current I is incremented by 0.1 A to +0.4 A, which is the maximum, in the segmented period D5'.

The difference in the absolute value of the current magnitude between the first polarity section and the second polarity section of the discharge lamp driving AC current I is then decremented by 0.1 A to −0.4 A, which is the minimum, in the segmented period D13'. The difference in the absolute value of the current magnitude between the first polarity section and the second polarity section of the discharge lamp driving AC current I is again incremented by 0.1 A. The difference in the absolute value of the current magnitude between the first polarity section and the second polarity section of the discharge lamp driving AC current I is thus repeatedly incremented and decremented in the cycle of Tb.

That is, in the present embodiment, when the power for driving the discharge lamp 90 is 200 W, both the absolute values of the maximum and minimum values of the difference in the absolute value of the current magnitude between the first polarity section and the second polarity section are 0.2 A. When the power for driving the discharge lamp 90 is 160 W, both the absolute values of the maximum and minimum values of the difference in the absolute value of the current magnitude between the first polarity section and the second polarity section are 0.4 A.

A description will be made of a specific example of the section current control in the discharge lamp lighting apparatus 10 according to the present embodiment.

Figure 10A:
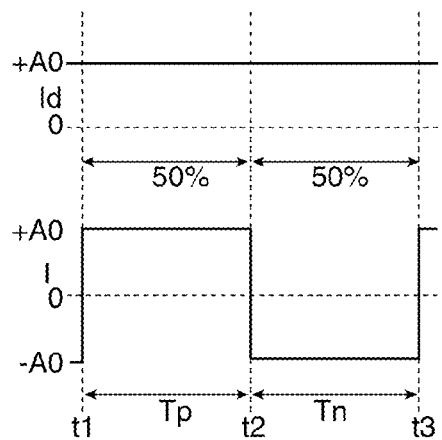
FIGS. 10A to 10E illustrate an example of control of a discharge lamp lighting apparatus according to at least one embodiment.

FIG. 10A shows the waveform of the DC current Id outputted from the power control circuit 20 and the waveform of the discharge lamp driving AC current I when the difference in the absolute value of the current magnitude between the first polarity section Tp and the second polarity section Tn of the discharge lamp driving AC current I is 0 A. The horizontal axis represents time, and the vertical axis represents the current magnitude. The time stamps t1, t2, and t3 represent the timings where the polarity of the discharge lamp driving AC current I is reversed. In the section from the time t1 to the time t2, the AC current I has the first polarity (the first electrode 92 acts as the anode), and the section is called the first polarity section (section Tp). In the section from the time t2 to the time t3, the AC current I has the second polarity (the first electrode 92 acts as the cathode), and the section is called the second polarity section (section Tn). The section Tp and the section Tn combines to form one cycle of the AC current I. The duty ratio of the discharge lamp driving AC current I is defined as the proportion of the first polarity section Tp to one cycle of the AC current I. In the examples shown in FIGS. 10A to 10E, the duty ratio is 50%.

In the example shown in FIG. 10A, the section current control is performed as follows: the DC current Id outputted from the power control circuit 20 is set to the same current magnitude (+A0) in the sections Tp and Tn. As a result, the discharge lamp driving AC current I has a current magnitude of (+A0) in the section Tp and a current magnitude of (−A0) in the section Tn. That is, the difference in the absolute value of the current magnitude between the first polarity section and the second polarity section of the discharge lamp driving AC current I is 0 A.

Figure 10B:
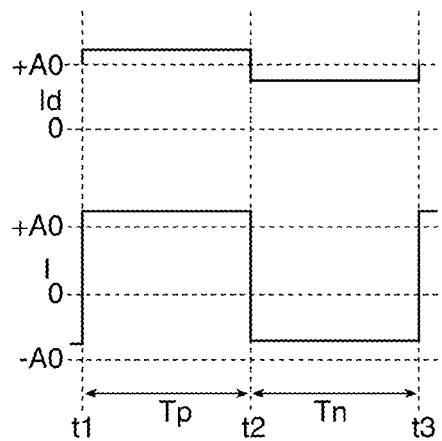

In the example shown in FIG. 10B, the section current control is performed as follows: The magnitude of the DC current Id outputted from the power control circuit 20 is set to +A0+0.05 A in the section Tp, and the magnitude of the DC current Id outputted from the power control circuit 20 is set to +A0−0.05 A in the section Tn. As a result, the discharge lamp driving AC current I has a current magnitude of (+A0+0.05 A) in the section Tp and a current magnitude of (−A0+0.05 A) in the section Tn. The difference in the absolute value of the current magnitude between the first polarity section and the second polarity section of the discharge lamp driving AC current I is +0.1 A.

Figure 10C:
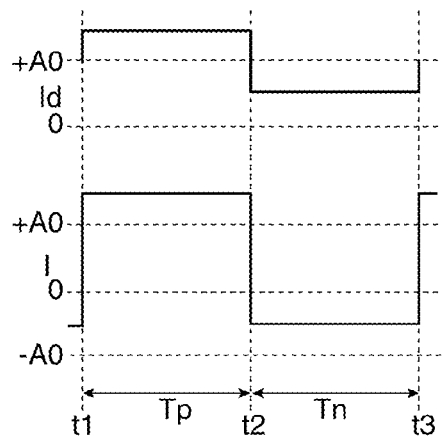
Figure 10D:
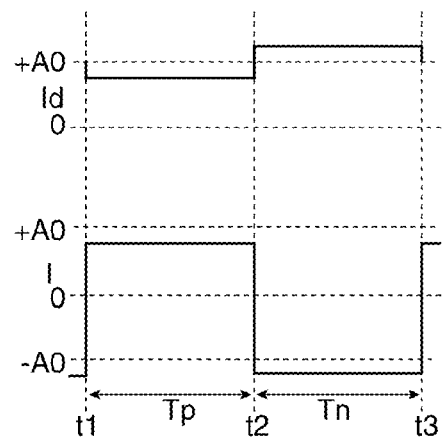
Figure 10E:
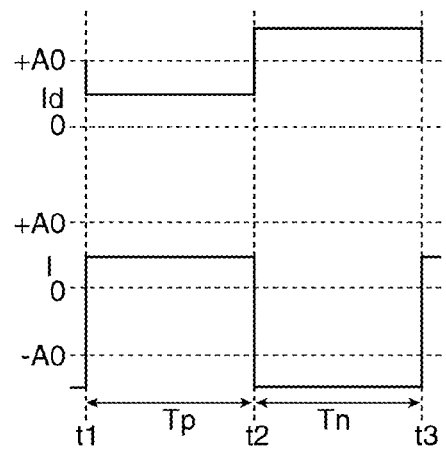

Similarly, in the example shown in FIG. 10C, the difference in the absolute value of the current magnitude between the first polarity section and the second polarity section of the discharge lamp driving AC current I is +0.2 A. In the example shown in FIG. 10D, the difference in the absolute value of the current magnitude between the first polarity section and the second polarity section of the discharge lamp driving AC current I is −0.1 A. In the example shown in FIG. 10E, the difference in the absolute value of the current magnitude between the first polarity section and the second polarity section of the discharge lamp driving AC current I is −0.2 A.

Figure 11A:
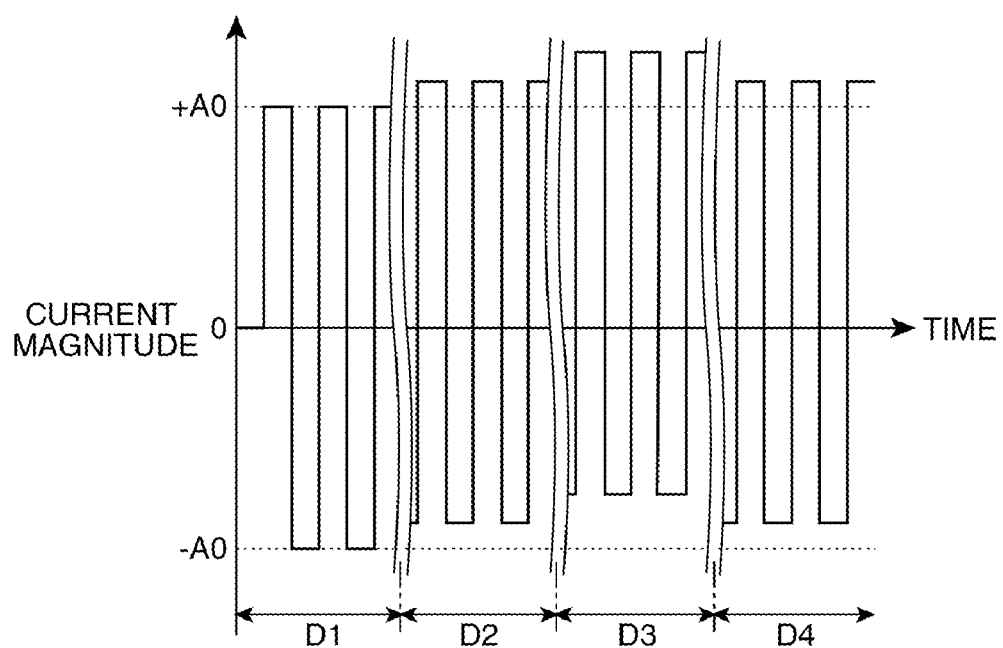
FIGS. 11A and 11B illustrate an example of control of a discharge lamp lighting apparatus according to at least one embodiment.
Figure 11B:
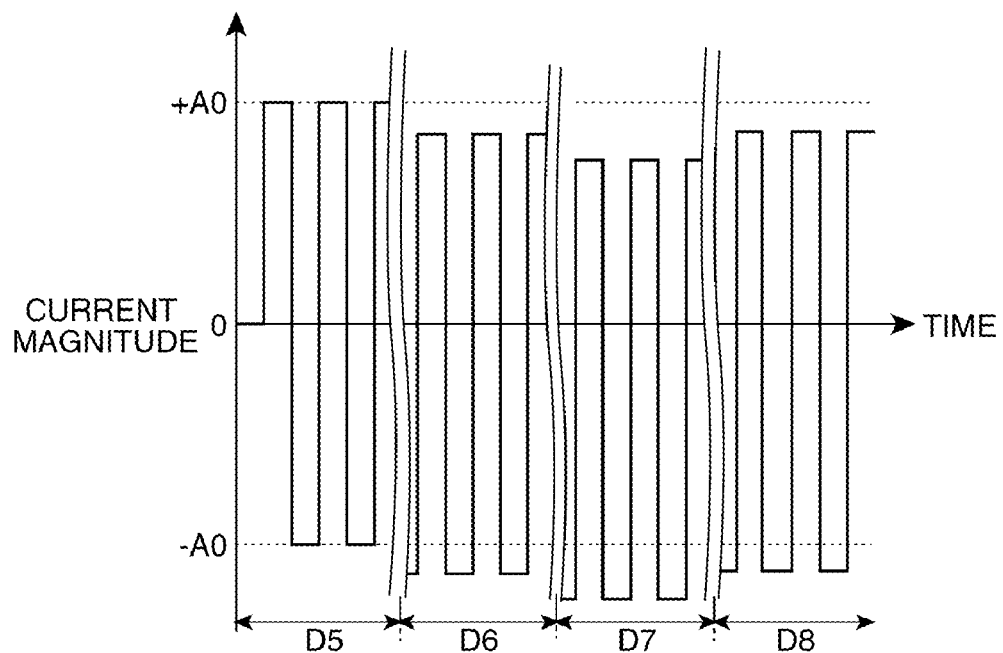
Figure 12:
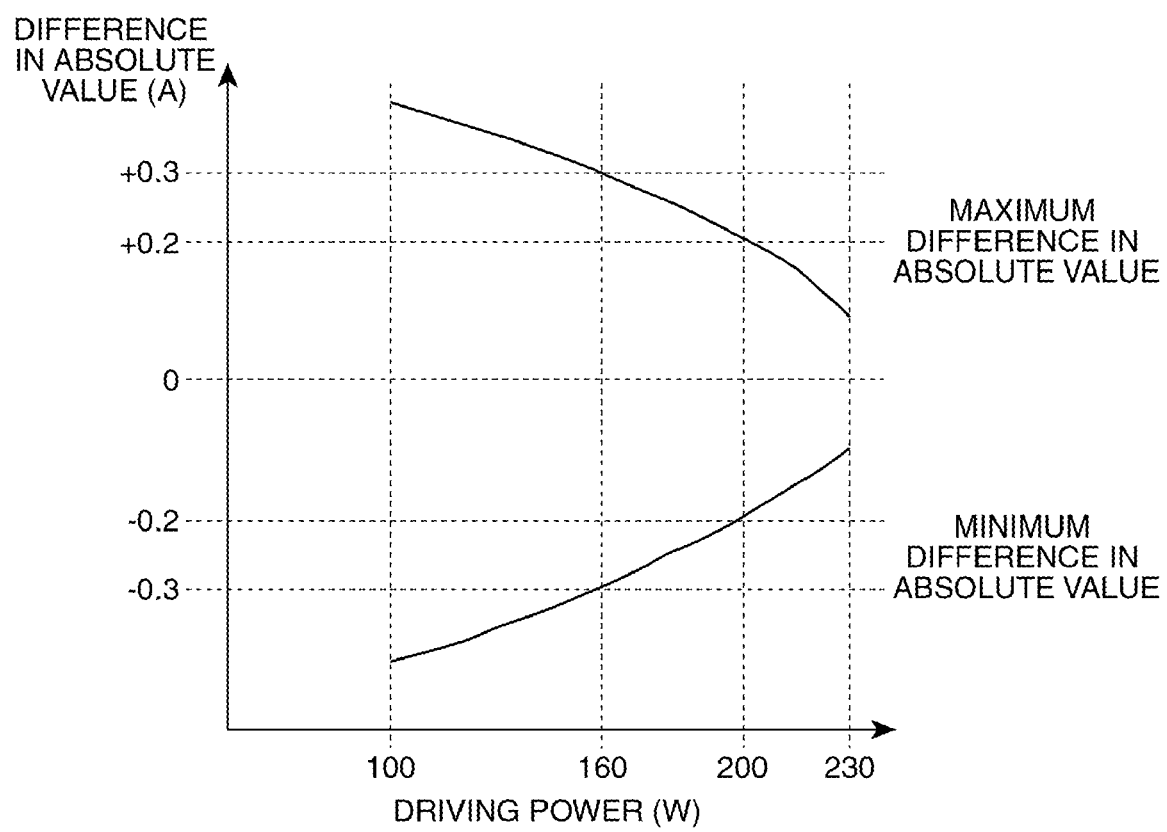
FIG. 12 illustrates a relationship between the driving power and the difference in the absolute value of the current magnitude.

FIGS. 11A and 11B show the transition of the waveform of the discharge lamp driving AC current I when the difference in the absolute value of the current magnitude between the first polarity section and the second polarity section of the discharge lamp driving AC current I is changed in accordance with the periodic pattern shown in FIG. 9. The horizontal axis represents time, and the vertical axis represents the current magnitude. While the following description will be made of the transition of the waveform when the power for driving the discharge lamp 90 is 200 W, the transition of the waveform when the power for driving the discharge lamp 90 is 160 W will be the same except the number of segmented periods and the maximum and minimum values of the difference in the absolute value of the current magnitude between the first polarity section and the second polarity section of the discharge lamp driving AC current I.

FIG. 11A shows the transition of the waveform of the AC current I from the segmented period D1 to the segmented period D4 in FIG. 9. In the segmented period D1, the current waveform with a difference in the absolute value of the current magnitude of 0 A between the first polarity section and the second polarity section of the discharge lamp driving AC current I continues. In the segmented period D2, the current waveform is changed to the one with a difference in the absolute value of the current magnitude of +0.1 A between the first polarity section and the second polarity section of the discharge lamp driving AC current I, and the new current waveform continues for the segmented period D2. In the segmented period D3, the current waveform is changed to the one with a difference in the absolute value of the current magnitude of +0.2 A between the first polarity section and the second polarity section of the discharge lamp driving AC current I, and the new current waveform continues for the segmented period D3. In the segmented period D4, the current waveform is changed to the one with a difference in the absolute value of the current magnitude of +0.1 A between the first polarity section and the second polarity section of the discharge lamp driving AC current I, and the new current waveform continues for the segmented period D4.

FIG. 11B shows the transition of the waveform of the AC current I from the segmented period D5 to the segmented period D8 in FIG. 9. In the segmented period D5, the current waveform with a difference in the absolute value of the current magnitude of 0 A between the first polarity section and the second polarity section of the discharge lamp driving AC current I continues. In the segmented period D6, the current waveform is changed to the one with a difference in the absolute value of the current magnitude of −0.1 A between the first polarity section and the second polarity section of the discharge lamp driving AC current I, and the new current waveform continues for the segmented period D6. In the segmented period D7, the current waveform is changed to the one with a difference in the absolute value of the current magnitude of −0.2 A between the first polarity section and the second polarity section of the discharge lamp driving AC current I, and the new current waveform continues for the segmented period D7. In the segmented period D8, the current waveform is changed to the one with a difference in the absolute value of the current magnitude of −0.1 A between the first polarity section and the second polarity section of the discharge lamp driving AC current I, and the new current waveform continues for the segmented period D8.

To suppress the formation of steady convection associated with light emission in the discharge lamp, it is desirable to change the electrode temperature within the largest possible range. When the power for driving the discharge lamp 90 is low, however, the power (energy) supplied to the electrodes 92 and 93 is low, and hence the electrode temperature varies within a small range. The power for driving the discharge lamp 90 is proportional to the DC current Id.

In the control of the discharge lamp lighting apparatus 10 according to the present embodiment, controlling the difference in the absolute value of the current magnitude between the first polarity section and the second polarity section of the discharge lamp driving AC current I in relation to the average of the DC current Id, that is, the power for driving the discharge lamp 90 allows the electrode temperature to vary in the largest possible range even when the discharge lamp is driven at a low power level.

It is therefore possible to suppress the formation of steady convection in the discharge lamp 90 so as to prevent uneven consumption of the electrodes and uneven precipitation of the electrode material. For example, increasing at least one of the absolute values of the maximum and minimum values of the difference in the absolute value of the current magnitude between the first polarity section and the second polarity section of the discharge lamp driving AC current I allows the electrode temperature to vary in the largest possible range even when the discharge lamp is driven at a low power level.

While the present embodiment has been described with reference to the two cases where the power for driving the discharge lamp 90 is 200 W and 160 W, the power for driving the discharge lamp 90 may be changed continuously or stepwise at a finer rate based on the power control signal S. In this case, for example, as indicated by the graphs shown in FIG. 12, the relationship between the power for driving the discharge lamp 90 and the maximum and minimum values of the difference in the absolute value of the current magnitude between the first polarity section and the second polarity section of the discharge lamp driving AC current I may be determined in advance, and the relationship data may be stored, for example, in the storage unit 44 in the controller 40.

Variation

While the above embodiment has been described with reference to the case where the absolute value of the maximum value of the difference in the absolute value of the current magnitude between the first polarity section and the second polarity section of the discharge lamp driving AC current I is the same as the absolute value of the minimum value of the difference in the absolute value of the current magnitude between the first polarity section and the second polarity section of the discharge lamp driving AC current I, one of the absolute values of the maximum and minimum values may be larger than the other.

In some structures, the temperature of one of the electrodes less likely decreases than the temperature of the other does. An example of such a structure is that shown in FIG. 2, where the secondary reflective mirror 50 covers the portion of the discharge lamp 90 that is on the second electrode 93 side. In this case, to more greatly change the temperature of the first electrode 92, which more likely decreases than the temperature of the second electrode 93, only one of the absolute values of the maximum and minimum values of the difference in the absolute value of the current magnitude between the first polarity section and the second polarity section of the discharge lamp driving AC current I is greater than the other so that the maximum value of the proportion of the period during which the first electrode 92 acts as the anode to one cycle of the AC current I is greater than the maximum value of the proportion of the period during which the second electrode 93 acts as the anode to one cycle of the AC current I.

For example, the section current control may be performed as follows: When the driving power is 200 W, the maximum value of the difference in the absolute value is +0.2 A and the minimum value of the difference in the absolute value is −0.2 A, whereas when the driving power is 160 W, the maximum value of the difference in the absolute value is +0.2 A and the minimum value of the difference in the absolute value is −0.4 A.

Further, while the frequency of the discharge lamp driving AC current I is fixed in the control in the above embodiment, the controller 40 may perform the AC conversion control as follows: The frequency of the discharge lamp driving AC current I is controlled in relation to the average of the DC current Id outputted from the power control circuit 20. For example, the controller 40 may perform the AC conversion control as follows: The frequency of the discharge lamp driving AC current I is increased as the average of the DC current Id outputted from the power control circuit 20 decreases.

In this case, for example, as indicated by the graph shown in FIG. 8, the relationship between the power for driving the discharge lamp 90 and the frequency of the discharge lamp driving AC current I may be determined in advance, and the relationship data may be stored, for example, in the storage unit 44 in the controller 40.

As described above, the control of increasing at least one of the absolute values of the maximum and minimum values of the difference in the absolute value of the current magnitude between the first polarity section and the second polarity section of the discharge lamp driving AC current I when the discharge lamp 90 is driven at a lower power level as compared with the case where the discharge lamp 90 is driven at a high power level, in combination with the control of increasing the frequency of the discharge lamp driving AC current I as the magnitude of the DC current Id outputted from the power control circuit 20 decreases, can not only suppress the formation of steady convection in the discharge lamp 90 to prevent uneven consumption of the electrodes and uneven precipitation of the electrode material, but also prevent flickering.

Circuit Configuration of Projector

Figure 13:
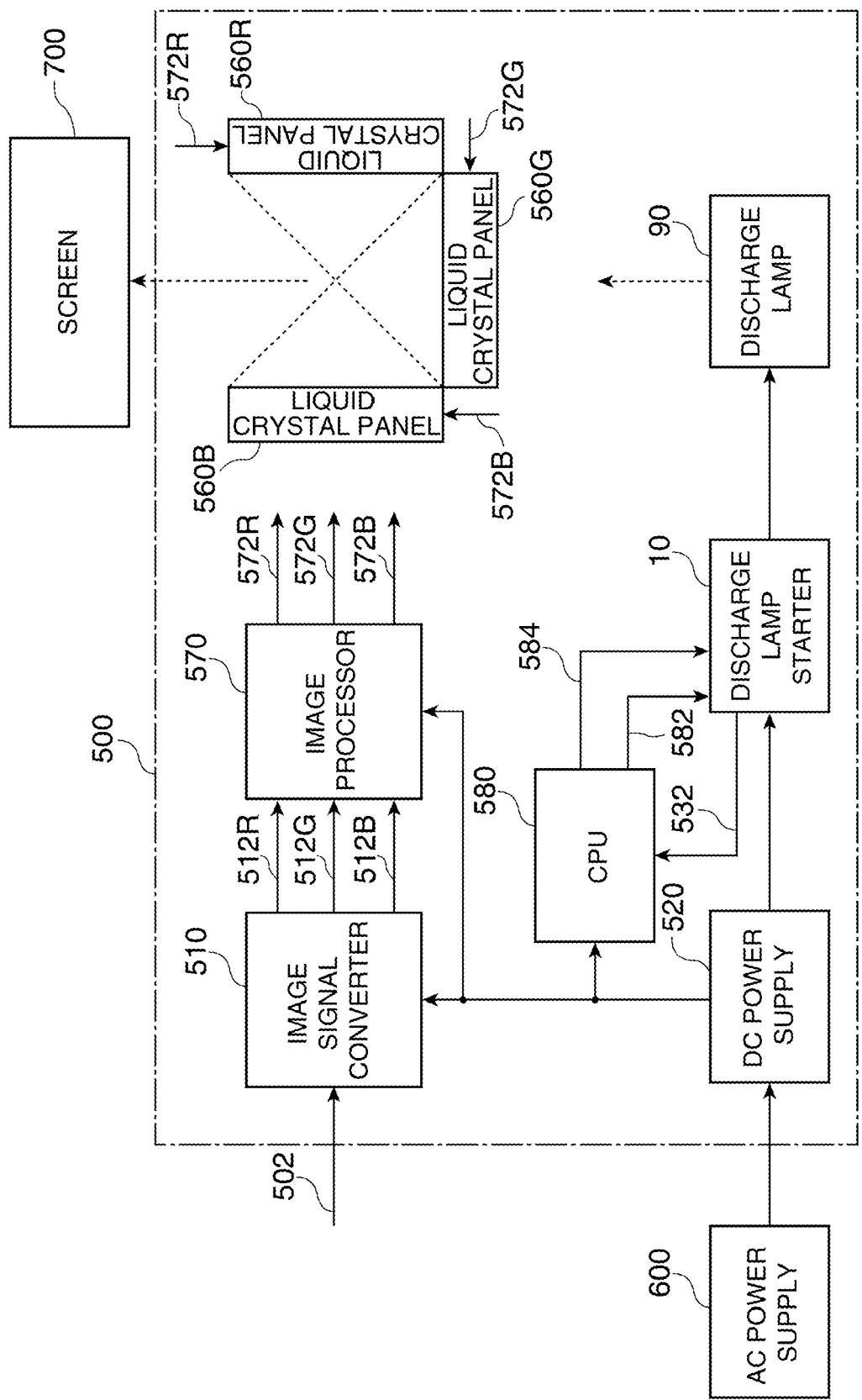
FIG. 13 illustrates a configuration of a projector according to at least one embodiment.

FIG. 13 shows an example of the circuit configuration of the projector according to the present embodiment. The projector 500 includes not only the optical system described above, but also an image signal converter 510, a DC power supply 520, the discharge lamp lighting apparatus 10, a discharge lamp 90, the liquid crystal panels 560R, 560G, and 560B, and an image processor 570.

The image signal converter 510 converts an externally inputted image signal 502 (such as a luminance-chrominance signal and an analog RGB signal) into a digital RGB signal with a predetermined word length to produce image signals 512R, 512G, and 512B and supplies them to the image processor 570.

The image processor 570 performs image processing on the three image signals 512R, 512G, and 512B and outputs drive signals 572R, 572G, and 572B for driving the liquid crystal panels 560R, 560G, and 560B.

The DC power supply 520 converts an AC voltage supplied from an external AC power supply 600 into a constant DC voltage and supplies the DC voltage to the image signal converter 510 and the image processor 570 on the secondary side of a transformer (although not illustrated but included in the DC power supply 520), and to the discharge lamp lighting apparatus 10 on the primary side of the transformer.

The discharge lamp lighting apparatus 10 produces a high voltage between the electrodes of the discharge lamp 90 when the discharge lamp 90 is turned on to cause dielectric breakdown so as to form a discharge path, and then supplies a driving current for allowing the discharge lamp 90 to maintain the discharge.

The liquid crystal panels 560R, 560G, and 560B use the drive signals 572R, 572G, and 572B according to the image signals to modulate the luminance values of the color light beams of the resultant images incident on the respective liquid crystal panels.

A CPU 580 controls all operations of the projector including starting and terminating the projector. When the projector is turned on and the output voltage from the DC power supply 520 becomes a predetermined value, the CPU 580 generates a start signal 582 and supplies it to the discharge lamp lighting apparatus 10. The CPU 580 may additionally supply a power control signal 584 to the discharge lamp lighting apparatus 10. Further, the CPU 580 may receive information 532 on the start status of the discharge lamp 90 from the discharge lamp lighting apparatus 10.

Since the thus configured projector 500 can suppress the formation of steady convention in the discharge lamp to prevent uneven consumption of the electrodes and uneven precipitation of the electrode material even when the discharge lamp is driven at a low power level, the projector can maintain its projection luminance for a long period.

In the above embodiments, the description has been made with reference to the projector using three liquid crystal panels, but the disclosure is not limited thereto. The disclosure is also applicable to a projector using one liquid crystal panel, a projector using two liquid crystal panels, and a projector using four or more liquid crystal panels.

In the above embodiments, the description has been made with reference to a transmission-type projector, but the disclosure is not limited thereto. The disclosure is also applicable to a reflection-type projector. The word "transmission-type" used herein means that an electro-optic modulator as a light modulator is of light-transmitting type, such as a transmissive liquid crystal panel, and the word "reflection-type" used herein means that the electro-optic modulator as the light modulator is of light-reflecting type, such as a reflective liquid crystal panel and a micromirror light modulator. For example, a DMD (Digital Micromirror Device: a trademark of Texas Instruments) can be used as the micromirror light modulator. When the disclosure is applied to a reflection-type projector, the same or similar effects as those provided in a transmission-type projector may also be provided.

The disclosure is applicable not only to a front projection projector that projects a projection image from the observation side but also to a rear projection projector that projects a projection image from the side opposite the observation side.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways.

The disclosure encompasses any configuration that is effectively the same as the configuration described with reference to the above embodiments or where there is only insubstantial change (for example, a configuration having substantially the same function, using substantially the same method, and providing substantially the same result, or a configuration having the same object and providing the same result). The disclosure also encompasses a configuration that is similar to the configuration described with reference to the above embodiments but has a non-essential portion replaced. The disclosure also encompasses a configuration providing the same or similar effects as that provided in the configuration described with reference to the above embodiments or a configuration capable achieving the same or similar objects as that of the configuration described with reference to the above embodiments. The disclosure also encompasses a configuration that is similar to the configuration described with reference to the above embodiments but to which a known technology is added.

For example, the controller 40 may perform section current control in which the magnitude of the DC current Id is maximized in the second half of each of the first and second polarity sections.

Further, the controller 40 may perform section current control in which the magnitude of the DC current Id is monotonously increased in each of the first and second polarity sections. Further, the controller 40 may perform section current control in which the magnitude of the DC current Id is appropriately varied in each of the first and second polarity sections.

In the foregoing, the absolute value of the magnitude of the current has been described by reference to a current having a constant value during each of the first and second polarity sections—that is, the current has a rectangular waveform. However, in the event that the waveform is not rectangular, the absolute value can be calculated based on the average, median, maximum, minimum or other value derivable from the current waveform in the first and second polarity sections.

This disclosure is intended to cover any adaptations or variations of the embodiments discussed herein. Therefore, it is manifestly intended that embodiments in accordance with the present disclosure be limited only by the claims and the equivalents thereof.

What is claimed is:

1. A discharge lamp lighting apparatus comprising:

a power control circuit that outputs a DC current;

an AC conversion circuit to which the DC current is inputted, the AC conversion circuit reversing a polarity of the DC current at predetermined timings to produce and output a discharge lamp driving AC current; and a controller configured to control the AC conversion circuit to perform an AC conversion control for controlling the timings at which a polarity of the discharge lamp driving AC current is reversed and configured to control the power control circuit to perform a current control for controlling a magnitude of the DC current, wherein the controller changes an accumulated energy supplied to each electrode of a discharge lamp in one cycle of the discharge lamp driving AC current in accordance with a periodic pattern, the periodic pattern includes a plurality of segmented periods during each of which the accumulated energy is maintained at a same level for a plurality of cycles of the discharge lamp driving AC current, and a level of the accumulated energy in at least two of the segmented periods differ from each other, and the controller performs the current control by externally receiving a power control signal and setting an average of the DC current in a section that corresponds to the one cycle of the discharge lamp driving AC current to a current magnitude that corresponds to the power control signal, and controlling a magnitude of the accumulated energy in relation to the average value of the DC current.

2. The discharge lamp lighting apparatus according to claim 1, wherein the controller performs the AC conversion control such that a frequency of the discharge lamp driving AC current is controlled in relation to the average value of the DC current.

3. The discharge lamp lighting apparatus according to claim 1, wherein the controller performs the AC conversion control such that a frequency of the discharge lamp driving AC current is increased as the average value of the DC current decreases.

4. A projector comprising the discharge lamp lighting apparatus according to claim 1.

5. A discharge lamp lighting apparatus comprising:
a power control circuit that outputs a DC current;
an AC conversion circuit to which the DC current is inputted, the AC conversion circuit repeatedly reversing a polarity of the DC current between a first polarity and a second polarity at predetermined timings to produce and output a discharge lamp driving AC current; and
a controller configured to control the AC conversion circuit to perform an AC conversion control where the timings at which a polarity of the discharge lamp driving AC current is reversed are used to control a duty ratio of the discharge lamp driving AC current, the duty ratio being a proportion of a period of the first polarity to one cycle of the discharge lamp driving AC current, and the controller configured to control the power control circuit to perform a current control for controlling a magnitude of the DC current,
wherein the controller performs the AC conversion control such that the duty ratio of the discharge lamp driving AC current is changed in accordance with a periodic pattern,
the periodic pattern includes a plurality of segmented periods during each of which the duty ratio is maintained at a value for a plurality of cycles of the discharge lamp driving AC current, and the duty ratio of at least two of the segmented periods differ from each other, and
the controller performs the current control by externally receiving a power control signal and setting an average of the DC current in a section that corresponds to the one cycle of the discharge lamp driving AC current to a current magnitude that corresponds to the power control signal, and performs the AC conversion control such that a difference between at least one of a maximum and minimum values of the duty ratio and a reference duty ratio is controlled in relation to the average value of the DC current.

6. The discharge lamp lighting apparatus according to claim 5,
wherein the controller performs the AC conversion control such that a difference between at least one of the maximum and minimum values of the duty ratio and the reference duty ratio is increased as the average value of the DC current decreases.

7. The discharge lamp lighting apparatus according to claim 5,
wherein the controller performs the AC conversion control such that a frequency of the discharge lamp driving AC current is controlled in relation to the average value of the DC current.

8. The discharge lamp lighting apparatus according to claim 5,
wherein the controller performs the AC conversion control such that a frequency of the discharge lamp driving AC current is increased as the average value of the DC current decreases.

9. A projector comprising the discharge lamp lighting apparatus according to claim 5.

10. A discharge lamp lighting apparatus comprising:
a power control circuit that outputs a DC current;
an AC conversion circuit to which the DC current is inputted, the AC conversion circuit repeatedly reversing a polarity of the DC current between a first polarity and a second polarity at predetermined timings to produce and output a discharge lamp driving AC current; and
a controller configured to control the AC conversion circuit to perform an AC conversion control for controlling the timings at which a polarity of the discharge lamp driving AC current is reversed and configured to control the power control circuit to perform a section current control for controlling a magnitude of the DC current,
wherein the controller performs the section current control such that a difference in an absolute value of a current magnitude between a first polarity section and a second polarity section of the discharge lamp driving AC current is changed in accordance with a periodic pattern,
the periodic pattern includes a plurality of segmented periods during each of which the difference in the absolute value is maintained at a same value for a plurality of cycles of the discharge lamp driving AC current, and differences in the absolute value in at least two of the segmented periods differ from each other, and
the controller performs the section current control by externally receiving a power control signal and setting an average of the DC current in a section that corresponds to one cycle of the discharge lamp driving AC current to a current magnitude that corresponds to the power control signal, and controlling the difference in the absolute value in relation to the average value of the DC current.

11. The discharge lamp lighting apparatus according to claim 10,
wherein the controller performs the section current control such that at least one of the absolute values of the maximum and minimum values of the difference in the absolute value of the current magnitude is increased as the average value of the DC current decreases.

12. The discharge lamp lighting apparatus according to claim 10,
wherein the controller performs the AC conversion control such that a frequency of the discharge lamp driving AC current is controlled in relation to the average value of the DC current.

13. The discharge lamp lighting apparatus according to claim 10,
wherein the controller performs the AC conversion control such that a frequency of the discharge lamp driving AC current is increased as the average value of the DC current decreases.

14. A projector comprising the discharge lamp lighting apparatus according to claim 10.

15. A method for controlling a discharge lamp lighting apparatus including
a power control circuit that outputs a DC current, and
an AC conversion circuit to which the DC current is inputted, the AC conversion circuit reversing a polarity of the DC current at predetermined timings to produce and output a discharge lamp driving AC current,
the method comprising:
controlling the AC conversion circuit to perform an AC conversion control for controlling the timings at which a polarity of the discharge lamp driving AC current is reversed;
controlling the power control circuit to perform a current control for controlling a magnitude of the DC current; and
changing an accumulated energy supplied to each electrode of a discharge lamp in one cycle of the discharge lamp driving AC current in accordance with a periodic pattern,
wherein the periodic pattern includes a plurality of segmented periods during each of which the accumulated energy is maintained at a same level for a plurality of cycles of the discharge lamp driving AC current, and a level of the accumulated energy in at least two of the segmented periods differ from each other, and wherein the changing in accordance with the periodic pattern includes performing the current control by externally receiving a power control signal and setting an average of the DC current in a section that corresponds to the one cycle of the discharge lamp driving AC current to a current magnitude that corresponds to the power control signal, and controlling a magnitude of the accumulated energy in relation to the average value of the DC current.

* * * * *